US012773624B2

(12) United States Patent
Abe et al.

(10) Patent No.: US 12,773,624 B2
(45) Date of Patent: Oct. 27, 2026

(54) NON-TRANSITORY COMPUTER-READABLE STORAGE MEDIUM HAVING GAME PROGRAM STORED THEREIN, GAME PROCESSING SYSTEM, GAME PROCESSING APPARATUS, AND GAME PROCESSING METHOD

(71) Applicant: Nintendo Co., Ltd., Kyoto (JP)

(72) Inventors: Goro Abe, Kyoto (JP); Hideaki Araki, Kyoto (JP); Masashi Okamoto, Kyoto (JP); Hiroki Kawamae, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 276 days.

(21) Appl. No.: 18/399,238

(22) Filed: Dec. 28, 2023

(65) Prior Publication Data

US 2025/0032913 A1 Jan. 30, 2025

(30) Foreign Application Priority Data

Jul. 26, 2023 (JP) ................................ 2023-121939

(51) Int. Cl.

| | |
|---|---|
| ***A63F 13/48*** | (2014.01) |
| ***A63F 13/211*** | (2014.01) |
| ***A63F 13/525*** | (2014.01) |
| ***A63F 13/5375*** | (2014.01) |

(52) U.S. Cl.

CPC ............ *A63F 13/48* (2014.09); *A63F 13/211* (2014.09); *A63F 13/525* (2014.09); *A63F 13/5375* (2014.09)

(58) Field of Classification Search

CPC ...... A63F 13/48; A63F 13/211; A63F 13/525; A63F 13/5375

See application file for complete search history.

(56) References Cited

U.S. PATENT DOCUMENTS

| | | | | |
|---|---|---|---|---|
| 8,777,742 | B2 * | 7/2014 | Sato | A63F 13/428 463/32 |
| 10,653,947 | B2 * | 5/2020 | Matsuzaki | G06T 13/80 |
| 10,870,053 | B2 * | 12/2020 | He | A63F 13/426 |
| 11,090,557 | B2 * | 8/2021 | Downs | A63F 13/26 |
| 11,383,159 | B2 * | 7/2022 | Imai | A63F 13/22 |

(Continued)

FOREIGN PATENT DOCUMENTS

| | | |
|---|---|---|
| JP | 2018-195172 | 12/2018 |
| JP | 2021-010561 | 2/2021 |
| JP | 2022-081163 | 5/2022 |

OTHER PUBLICATIONS

"Wario Ware: Smooth Moves", Nintendo Co., Ltd., [online], searched on Jul. 11, 2023, 4 pages, internet URL: https://www.nintendo.co.jp/wii/rodj/soft_info/index.html (with machine translation).

(Continued)

*Primary Examiner* — Ankit B Doshi

(74) *Attorney, Agent, or Firm* — Nixon & Vanderhye PC

(57) ABSTRACT

During a waiting period before the start of a game, a model video in which a model object imitating a player holding a controller makes a pose set in advance according to the type of the game is displayed, and the model video is displayed as an animation in which the model object rotates from an orientation in which a front side of the model object is displayed to an orientation in which at least a part of a back side of the model object is displayed.

28 Claims, 18 Drawing Sheets

(56) References Cited

U.S. PATENT DOCUMENTS

| | | | | |
|---|---|---|---|---|
| 11,638,874 | B2 * | 5/2023 | Lutz | A63F 13/537<br>463/31 |
| 2020/0139240 | A1 * | 5/2020 | Hrincár | G06T 13/40 |
| 2020/0143595 | A1 * | 5/2020 | Hrincár | G06F 3/012 |
| 2021/0001226 | A1 * | 1/2021 | Suzuki | A63F 13/65 |
| 2021/0299559 | A1 * | 9/2021 | Yoshinobu | A63F 13/53 |
| 2022/0152502 | A1 * | 5/2022 | Abe | A63F 13/56 |

OTHER PUBLICATIONS

Dec. 2, 2025 Office Action issued in Japanese Patent Application No. 2023-121939, pp. 1-8 [English translation included].

* cited by examiner

NON-TRANSITORY COMPUTER-READABLE STORAGE MEDIUM HAVING GAME PROGRAM STORED THEREIN, GAME PROCESSING SYSTEM, GAME PROCESSING APPARATUS, AND GAME PROCESSING METHOD

CROSS REFERENCE TO RELATED APPLICATION

This application claims priority to Japanese Patent Application No. 2023-121939 filed on Jul. 26, 2023, the entire contents of which are incorporated herein by reference.

FIELD

The present disclosure relates to information processing for a game or the like.

BACKGROUND AND SUMMARY

Hitherto, there have been games in which an image showing how to hold controllers is displayed before the game starts.

When holding controllers with left and right hands, it is conceivable that a player cannot instantly determine whether or not an image showing how to hold controllers is a laterally inverted image (i.e., an image displayed as if reflected in a mirror). In particular, when the player is required to take a laterally asymmetric posture (i.e., hold the controllers in a laterally asymmetric manner), the player may make an operational error if the player makes a mistake in holding the controllers.

Therefore, it is an object of the exemplary embodiments to provide a non-transitory computer-readable storage medium having a game program stored therein, a game processing system, a game processing apparatus, and a game processing method that are capable of displaying a how-to-hold image whose orientation is easily grasped by a player.

In order to attain the object described above, for example, the following configuration examples are exemplified.

A first configuration example is directed to a non-transitory computer-readable storage medium having stored therein instructions that, when executed by a processor of an information processing apparatus for executing a plurality of types of games in succession, cause the information processing apparatus to:

for each of the games executed in succession,

- during a waiting period before start of the game, display a model video in which a model object imitating a player holding a controller makes a pose set in advance according to the type of the game, and, for a first type of game, display the model video as an animation in which the model object rotates from an orientation in which a front side of the model object is displayed to an orientation in which at least a part of a back side of the model object is displayed; and
- start the game after the waiting period, display at least a motion instruction indicating a motion to be performed by the player in the game, perform an evaluation of movement of the controller on the basis of operation data acquired from the controller including an inertial sensor, and cause the game to progress on the basis of the evaluation.

According to the above first configuration example, by rotating the model object, it becomes easier to understand that the model object is not displayed so as to be laterally inverted as if reflected in a mirror, and in the case of performing the games in succession, the player can be prevented from failing to be ready for each game in time.

In a second configuration example based on the first configuration example, the instructions cause the information processing apparatus to:

- during the waiting period, display the model video by the model object imitating a player holding controllers with left and right hands thereof; and
- in the game, perform the evaluation on the basis of first operation data acquired from a first controller and second operation data acquired from a second controller.

According to the above second configuration example, in the case of playing the game while holding the controllers with both hands, respectively, there is no confusion as to whether or not the model object is displayed so as to be laterally inverted.

In a third configuration example based on the second configuration example, the first type of game includes a second type of game in which the pose is set as a laterally asymmetric pose for the model object.

According to the third configuration example, in a game in which a laterally asymmetric pose is made, whether or not the model object is displayed so as to be laterally inverted is particularly problematic, but this problem can be significantly eliminated.

In a fourth configuration example based on the third configuration example, the instructions cause the information processing apparatus to:

- in a predetermined scene before the plurality of types of games are executed in succession, set one of the left and right hands of the player as a dominant hand; and
- for the second type of game, according to the set dominant hand,
  - in the display of the model video, cause the model object to make a first pose or a second pose laterally inverted from the first pose, and
  - in the game, swap the first operation data and the second operation data used for the evaluation, and perform the evaluation.

According to the fourth configuration example, by setting a dominant hand, a game in which a laterally asymmetric pose is made can be performed such that display of an object to be operated or the like is inverted.

In a fifth configuration example based on the second configuration example, the instructions cause the information processing apparatus to:

- for a third type of game included in the first type of game, display the model video as an animation in which the model object rotates from the orientation in which the front side of the model object is displayed to an orientation in which an oblique back portion of the model object is displayed; and
- for a fourth type of game included in the first type of game, display the model video as an animation in which the model object rotates from the orientation in which the front side of the model object is displayed to an orientation in which a back portion of the model object is displayed.

In a sixth configuration example based on the fifth configuration example, the third type of game is a game in which the pose is set as a pose in which the left and right hands are positioned in front of the model object.

According to the sixth configuration example, each hand part, of the model object, holding the controller can be prevented from being hidden by the trunk of the model object.

In a seventh configuration example based on the second configuration example, the instructions cause the information processing apparatus to, for a fifth type of game in which the pose is set as a laterally symmetric pose for the model object and which is not included in the first type of game, display the model video as an animation remaining in an orientation in which the front side or the back side of the model object is displayed.

According to the seventh configuration example, for some games in which an object to be operated is laterally symmetric, the presence or absence of lateral inversion does not become a problem, so that the model video can be an animation in which the front side or the back side of the model object remains displayed.

In an eighth configuration example based on the first configuration example, the instructions cause the information processing apparatus to:

display the model video by rendering the model object in the virtual space on the basis of a virtual camera; and for the first type of game, display the model video while rotating the model object or the virtual camera from a positional relationship in which the front side of the model object faces the virtual camera to a positional relationship in which the back side or an oblique back side of the model object faces the virtual camera.

In a ninth configuration example based on the eighth configuration example, the instructions cause the information processing apparatus to, for the first type of game, display the model video as an animation in which the model object makes the pose, while rotating the model object or the virtual camera.

According to the ninth configuration example, by the model object making the pose using the animation, it can be made easier to understand the pose.

According to the exemplary embodiment, it is possible to provide a non-transitory computer-readable storage medium having a game program stored therein, a game processing system, a game processing apparatus, and a game processing method that are capable of displaying a how-to-hold image whose orientation is easily grasped by a player.

DETAILED DESCRIPTION OF NON-LIMITING EXAMPLE EMBODIMENTS

Hereinafter, an exemplary embodiment will be described.

[Hardware Configuration of Information Processing System]

Hereinafter, an information processing system (game system) according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
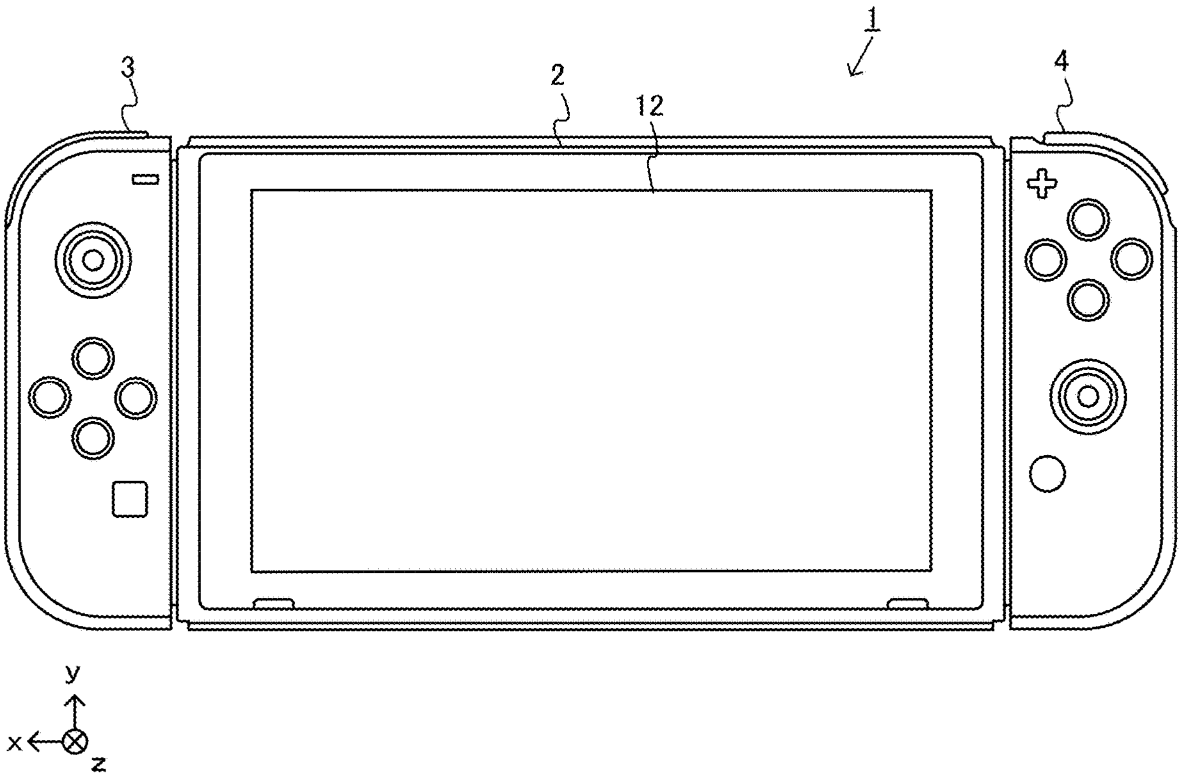
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
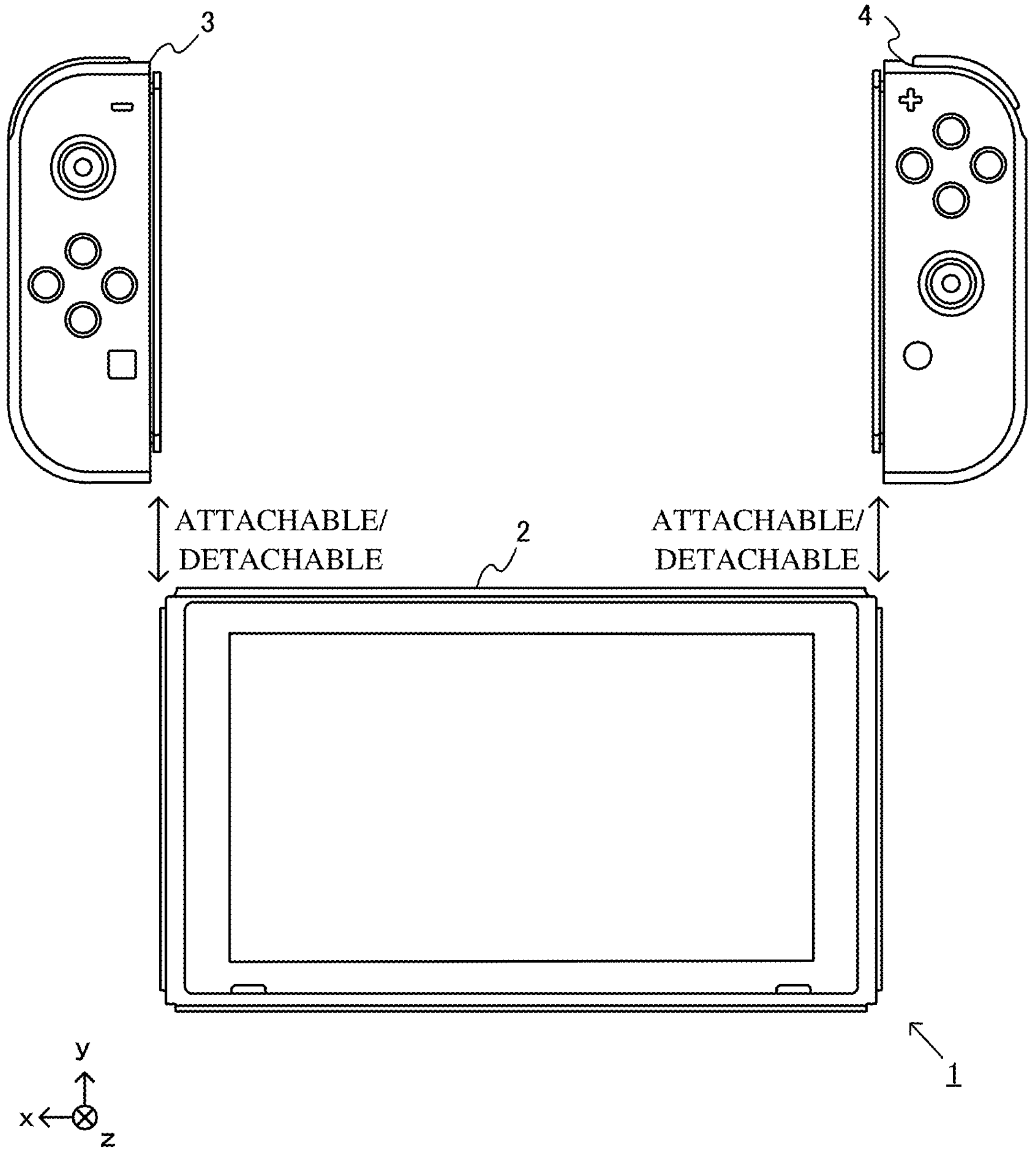
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as “controller”.

Figure 3:
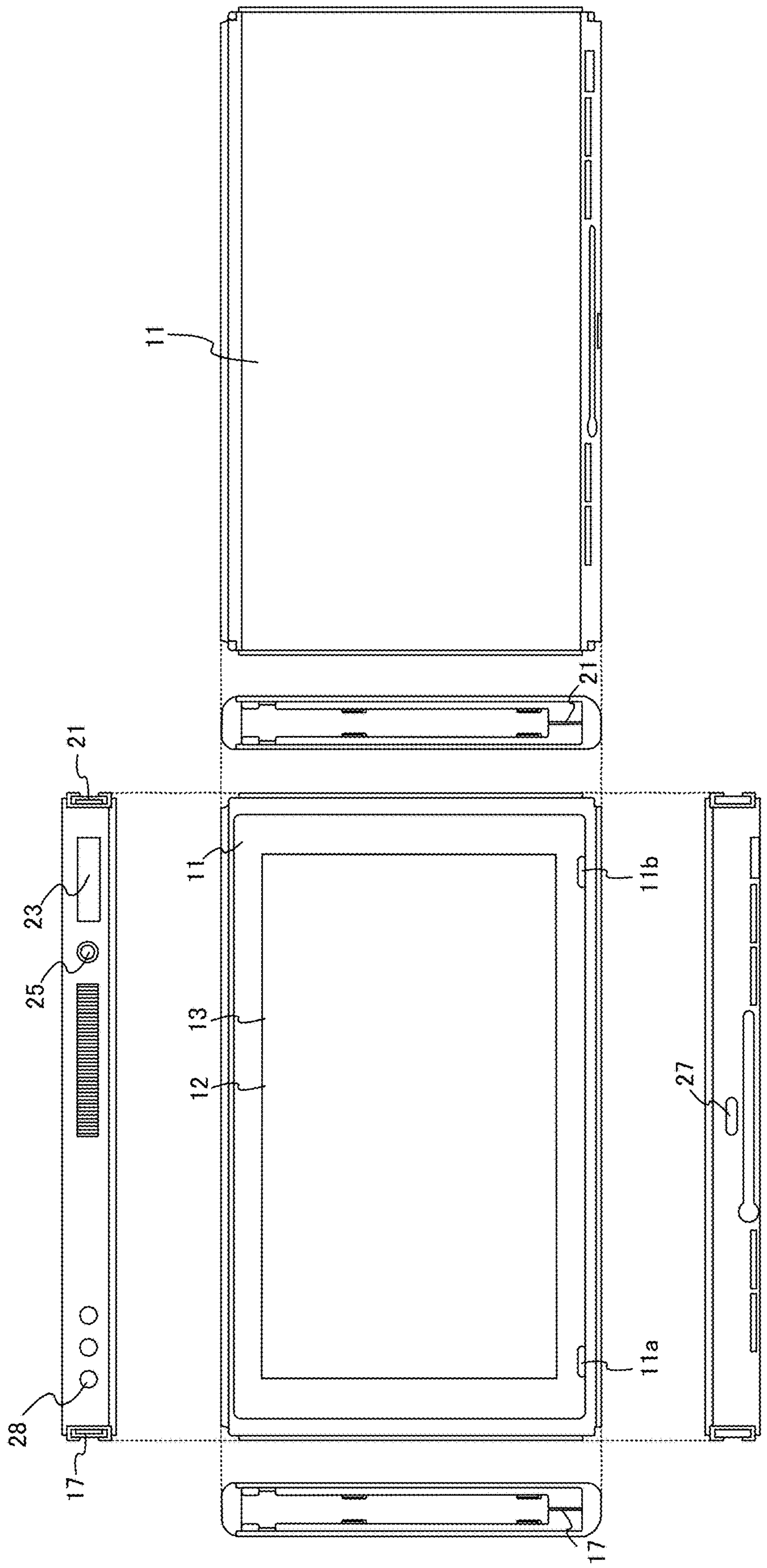
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11*a* and 11*b* are formed in the main surface of the housing 11. Then, sounds outputted from the speakers 88 are outputted through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
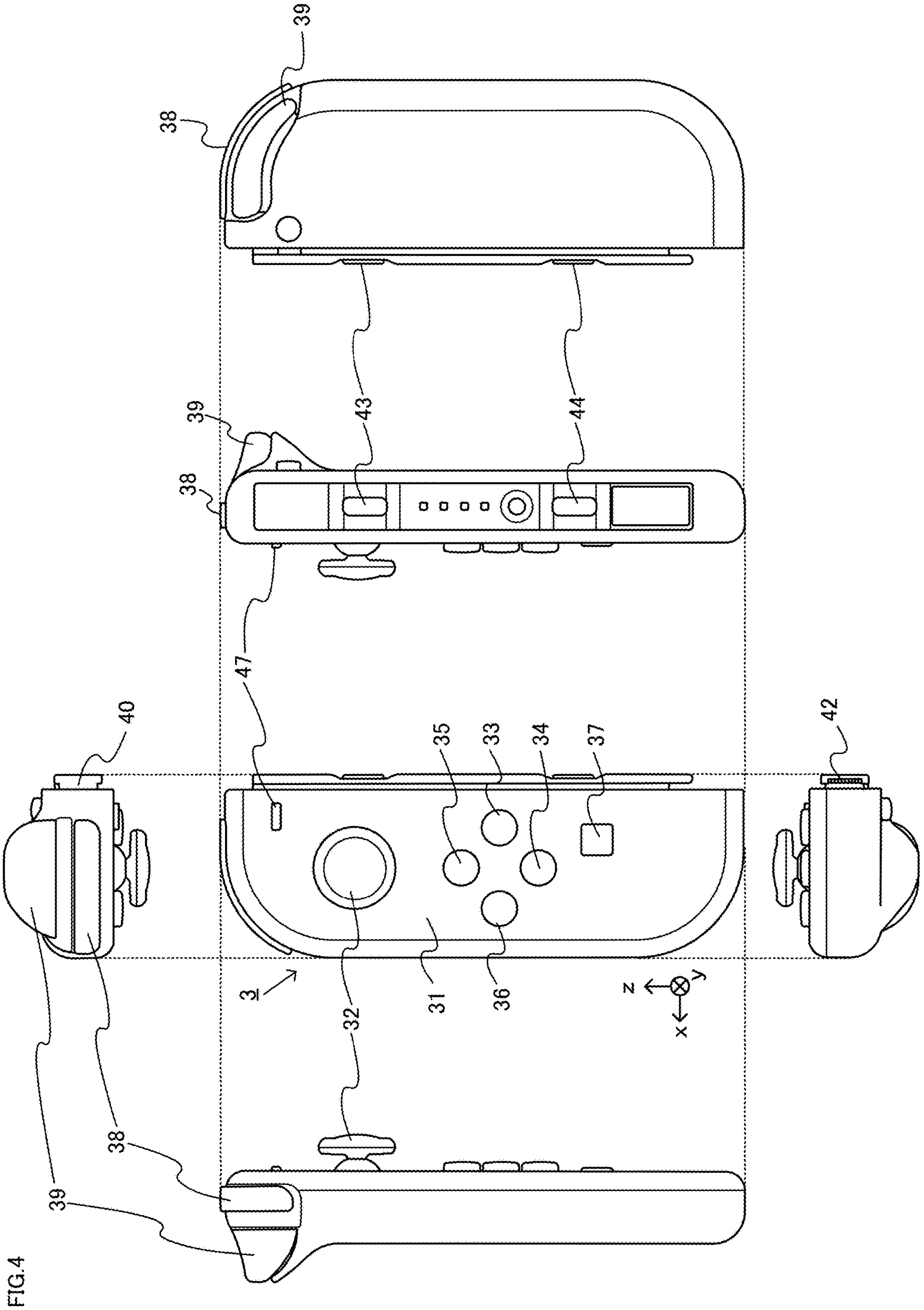
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "–" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
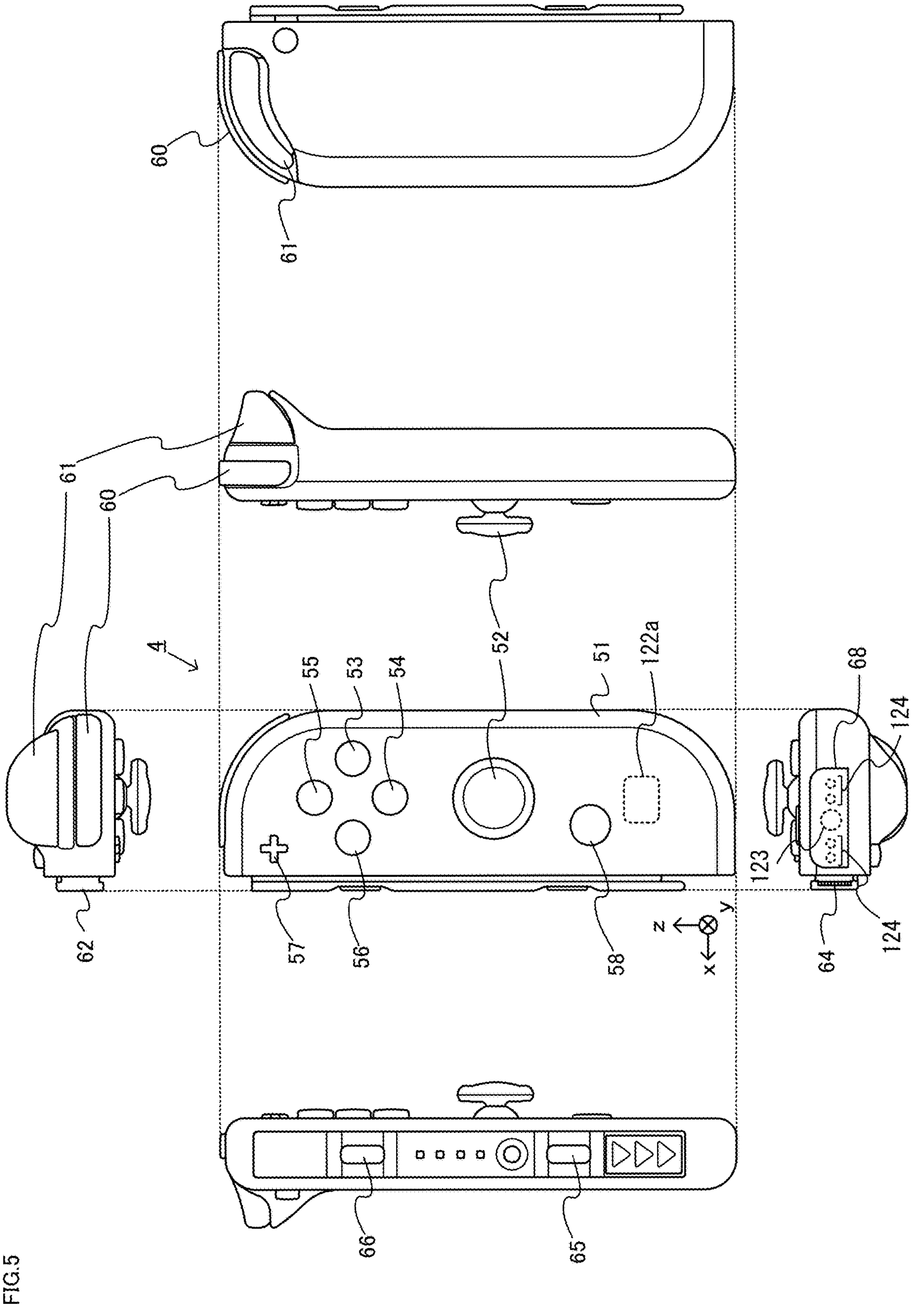
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
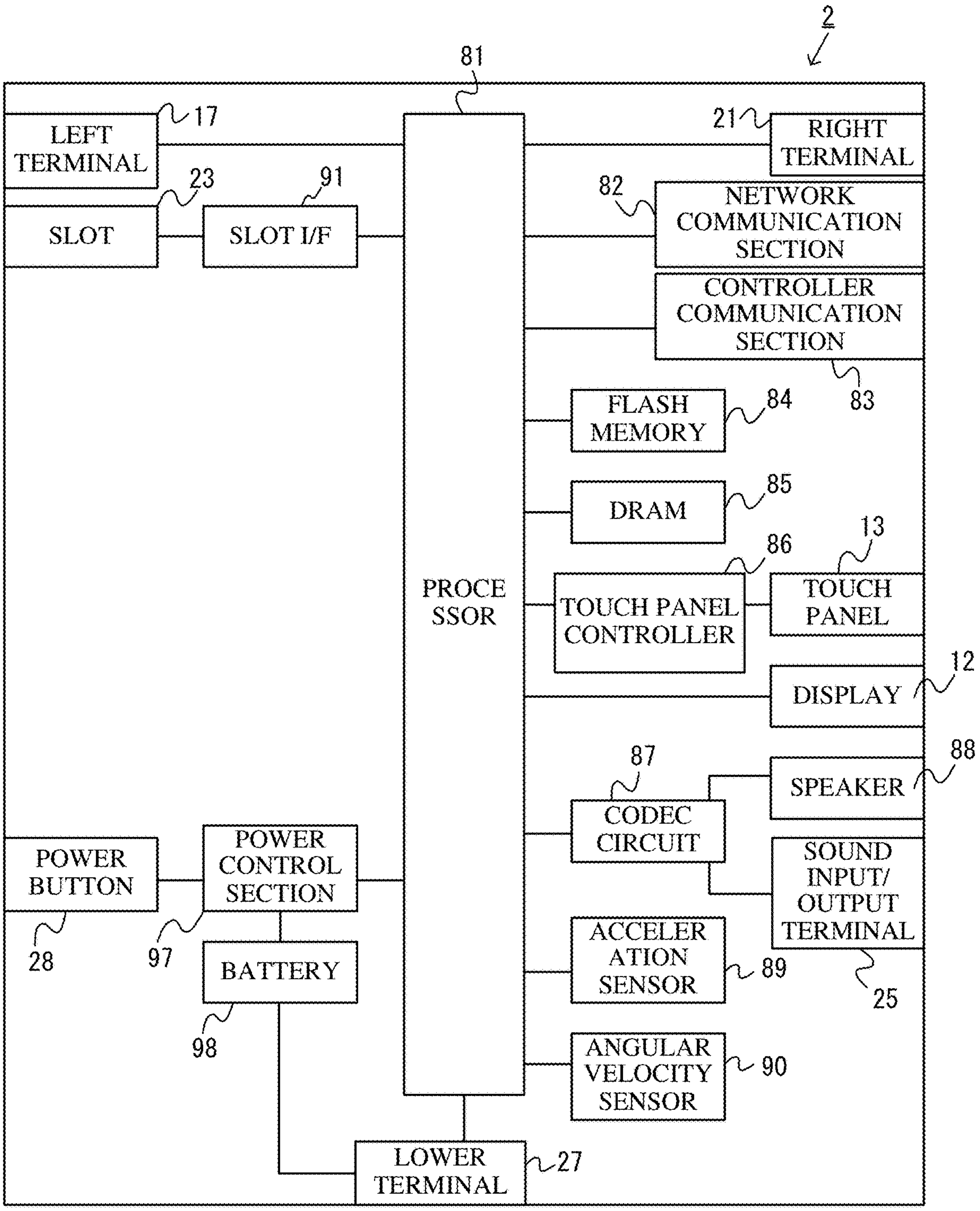
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various types of data (or programs) to be saved in the main body apparatus 2. The DRAM 85 is a memory used to temporarily store various types of data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, the network communication section 82 connects to a wireless LAN by a method compliant with the Wi-Fi standard, for example, and performs Internet communication or the like with an external apparatus (another main body apparatus 2). Further, the network communication section 82 can also perform short-range wireless communication (e.g., infrared light communication) with another main body apparatus 2.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
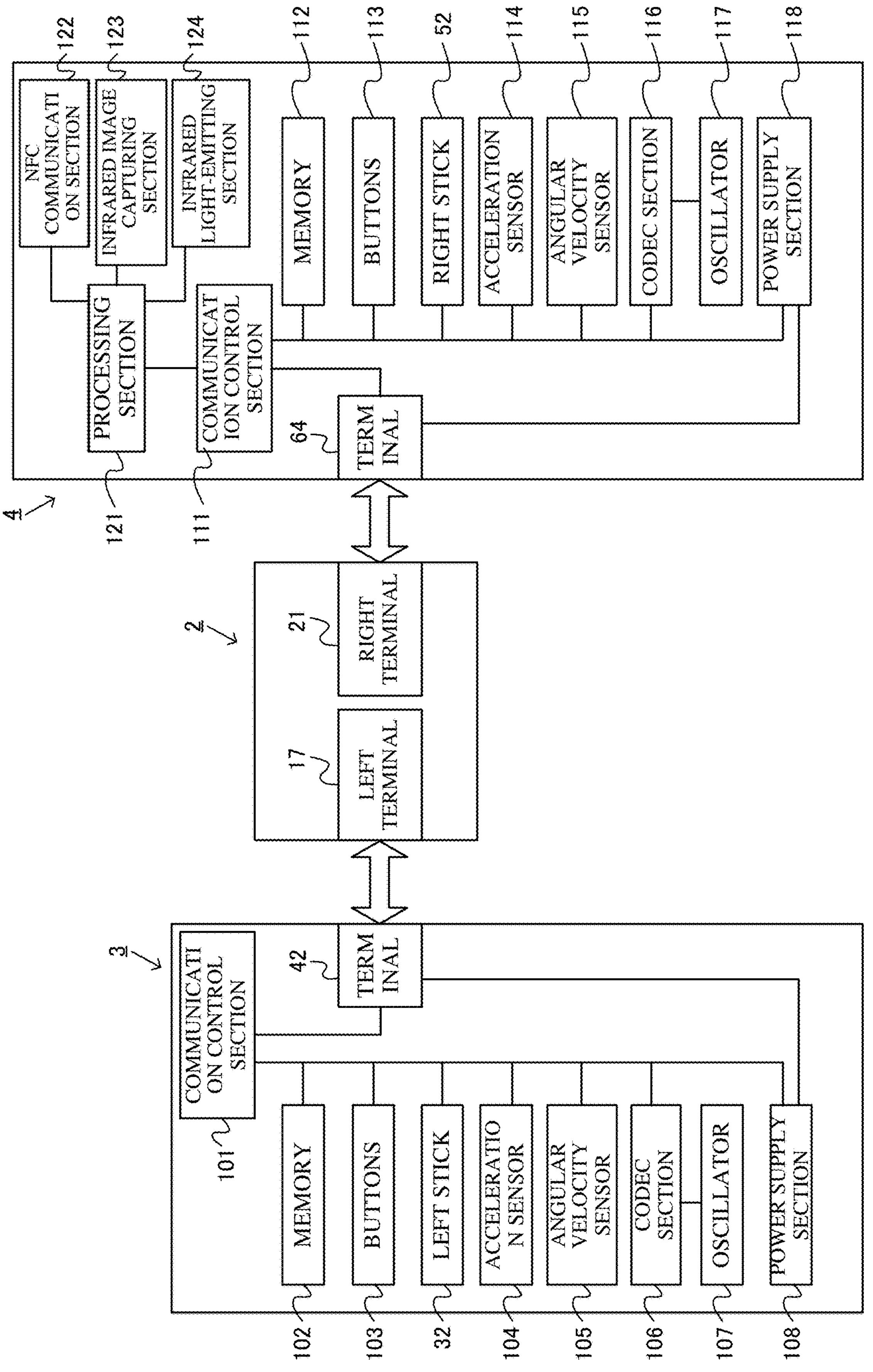
FIG. 7 is a block diagram showing a non-limiting example of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Figure 8:
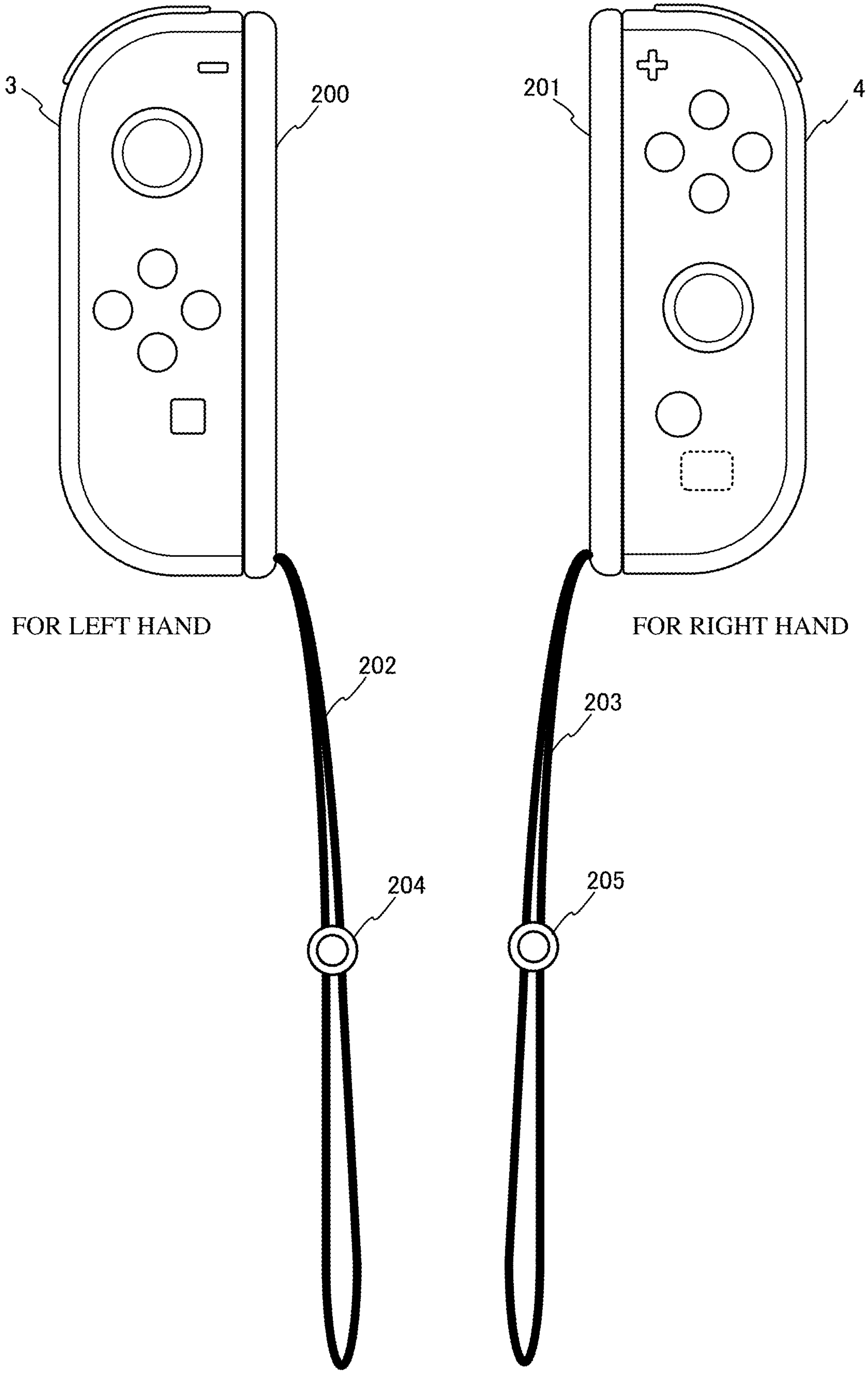
FIG. 8 shows a non-limiting example of the left controller 3 and the right controller 4 to each of which a string is attached.

FIG. 8 shows an example of the case where a string for passing a wrist of a player therethrough is attached to each of the left controller 3 and the right controller 4. As shown in FIG. 8, a string attachment member 200 is attached and fixed to a portion, of the left controller 3, which is attached to the main body apparatus 2 (see FIG. 1 and FIG. 4). Both ends of a string 202 are fixed to an end portion of the string attachment member 200. In addition, an adjustment member 204 for adjusting the size of a loop portion through which the left wrist of the player is passed is attached to the string 202. Similarly, as shown in FIG. 8, a string attachment member 201 is attached and fixed to a portion, of the right controller 4, which is attached to the main body apparatus 2 (see FIG. 1 and FIG. 4). Both ends of a string 203 are fixed to an end portion of the string attachment member 201. In addition, an adjustment member 205 for adjusting the size of a loop portion through which the right wrist of the player is passed is attached to the string 203. The player can hold the left controller 3 with the left wrist passed through the loop portion of the string 202, can hold the right controller 4 with the right wrist passed through the loop portion of the string 203, and can play games, etc.

[Game Assumed in Exemplary Embodiment]

Next, an outline of game processing (an example of the information processing) executed in the game system 1 according to the exemplary embodiment will be described. The game assumed in the exemplary embodiment is a game in which multiple short games are played in succession, and when a short game is cleared, the next short game starts. The game ends when the player fails to clear a short game, and when playing the game again, the game can be restarted, for example, from the short game that was failed to be cleared.

[Outline of Game Processing of Exemplary Embodiment]

In this game processing, during a waiting period before the start of each short game, a model video showing the player (user) how to hold controllers is displayed, and then the short game is played. The model video is a video obtained by capturing a model object placed in a virtual space (game space) by a virtual camera, and shows that a model object imitating the player holding the left controller 3 with the left hand and the right controller 4 with the right hand makes a pose (a pose set in advance according to the short game to be executed after the model video is displayed). Then, the player makes the pose shown in the model video (the pose of holding the controllers in the same manner as the pose of the model object) and starts an operation in the short game. Hereinafter, the model video and the short game will be specifically described.

Figure 9:
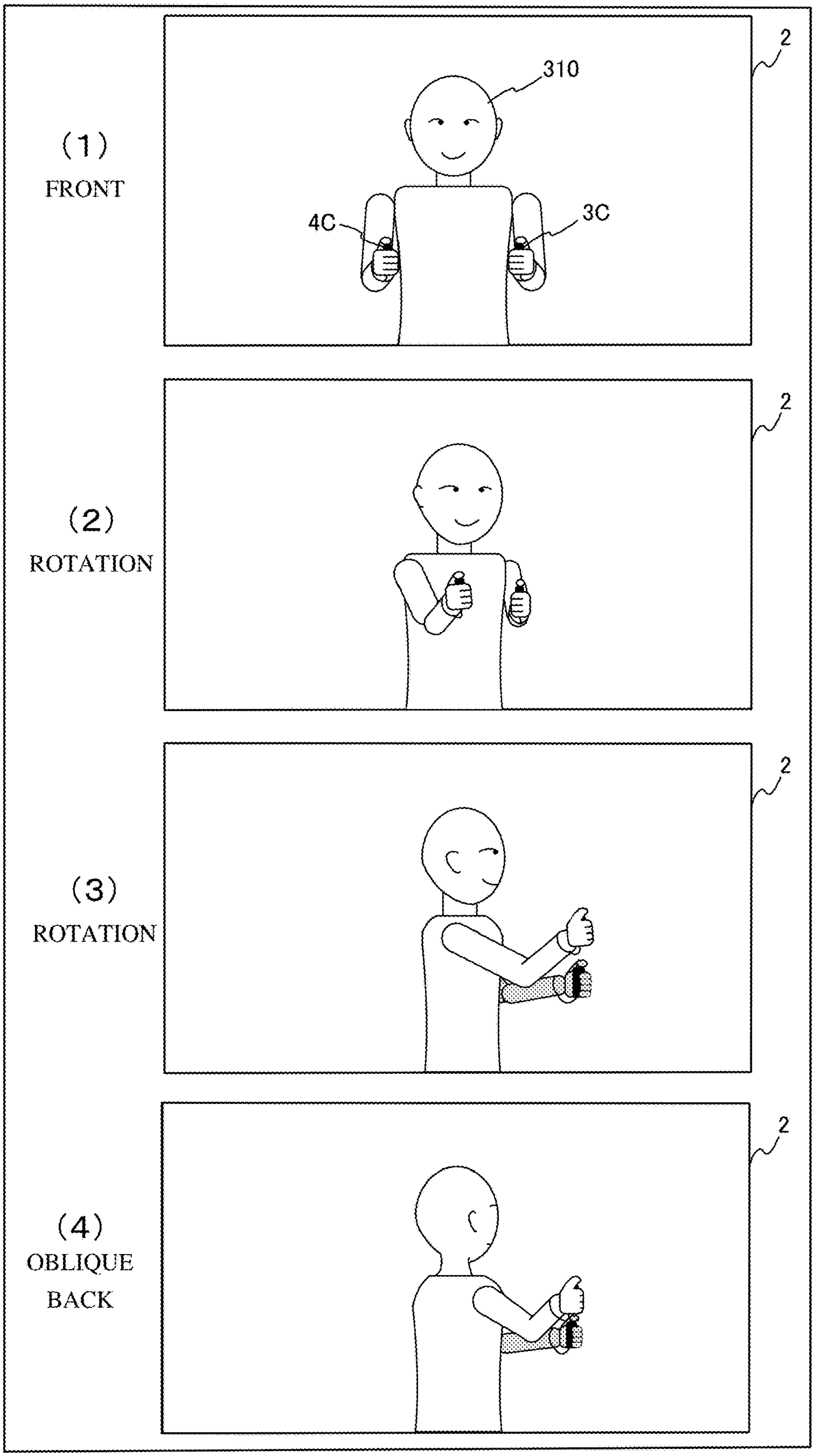
FIG. 9 illustrates a non-limiting example of a model video in which a model object holding controllers makes a pose.
Figure 10:
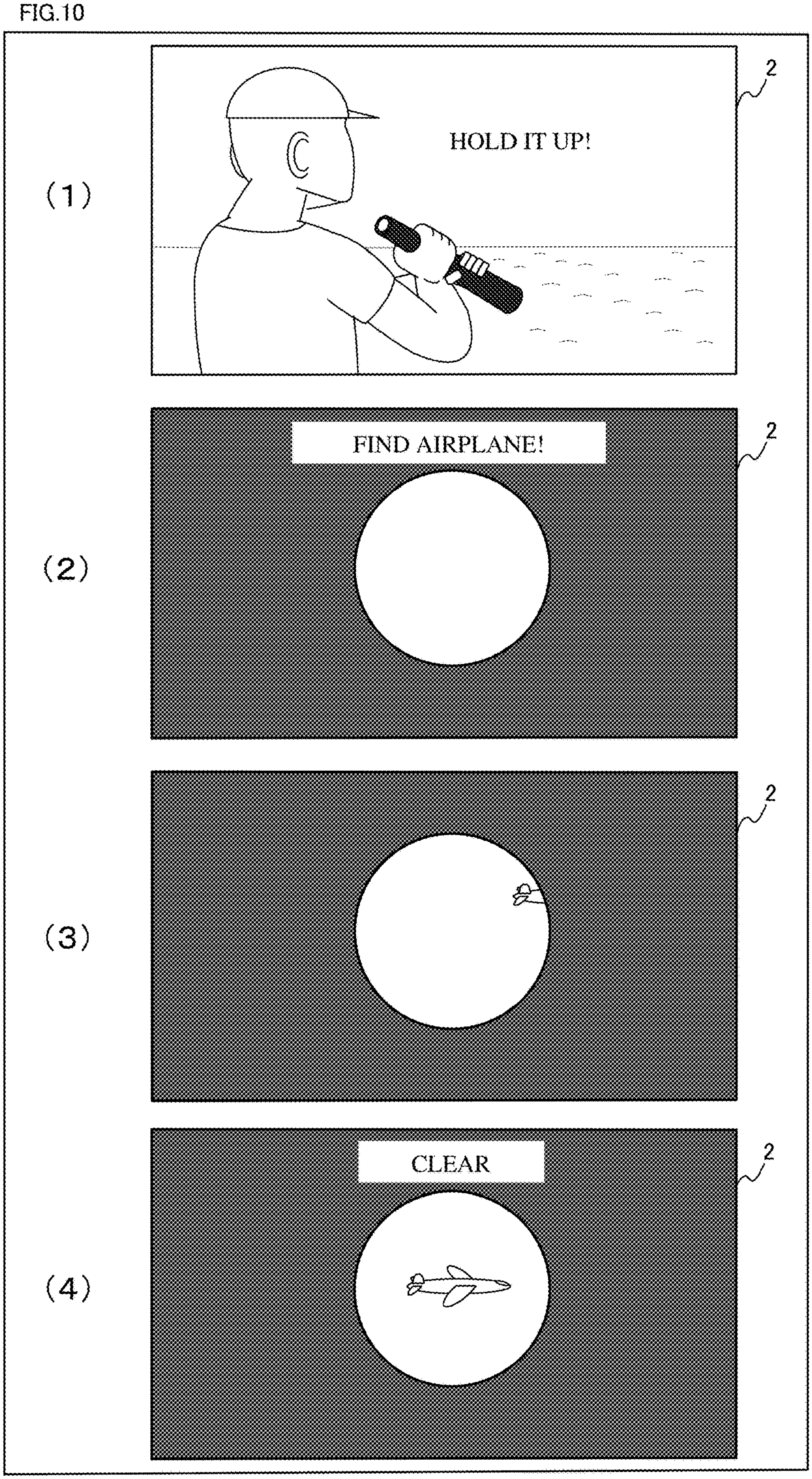
FIG. 10 illustrates a non-limiting example of a short game.

FIG. 9 illustrates an example of a model video (animation; sometimes referred to as "model video 1") showing the player how to hold the controllers before the start of a short game in which a telescope is used to find an airplane. FIG. 10 illustrates an example of the short game in which a telescope is used to find an airplane.

The model video 1 is started from a state where, as shown in FIG. 9(1), a model object 310 faces the front (in a direction toward the virtual camera), holds a right controller image 4C showing the right controller 4 with the right hand such that the thumb of the right hand is on the upper side, and holds a left controller image 3C showing the left controller 3 with the left hand such that the thumb of the left hand is on the upper side, the left and right elbows are bent at approximately 90 degrees, and the left and right hands are positioned in front of the trunk of the model object 310. Then, as shown in FIG. 9(2), the model object 310 extends the left and right arms by projecting the left and right hands forward while rotating counterclockwise. Then, as shown in FIG. 9(3), the model object 310 moves the right hand holding the right controller image 4C, to a position above the left hand holding the left controller image 3C, while further rotating counterclockwise and further extending the left and right arms by projecting the left and right hands forward. Then, as shown in FIG. 9(4), the model object 310 further rotates counterclockwise to a position where the right oblique back side (right oblique back portion) of the model object 310 is captured by the virtual camera, makes a pose (laterally asymmetric pose) in which the right hand holding the right controller image 4C such that the thumb of the right hand is on the upper side is located above the left hand holding the left controller image 3C such that the thumb of the left hand is on the upper side, and stops for a predetermined time (e.g. 0.5 seconds), and then the animation of the model video 1 is completed.

As described above, in the model video 1, the model object 310 moves both hands holding the controllers while rotating, and finally makes a pose viewed from the right oblique back side (a pose in which the right oblique back portion is displayed), in which the state of the arms and the hands is visible. This allows the player to intuitively understand that the model object 310 is not displayed so as to be laterally inverted as if reflected in a mirror, and also allows the player to quickly and intuitively understand a pose to be made at the start of a short game described later with reference to FIG. 10 (a pose to be made while holding the controllers with both hands).

When the display of the model video 1 is completed, the short game in FIG. 10 in which a telescope is used to find an airplane starts. First, as shown in FIG. 10(1), an image in which a human object holding a telescope with its left and right hands is facing in a direction toward the sea is displayed. The pose of the human object holding the telescope is the same as or similar to the pose shown in the model video 1, and the orientation of the human object is also the same as or similar to that shown in the model video 1 (see FIG. 9(4)). In addition, as shown in FIG. 10(1), a motion instruction "Hold it up!" is displayed on the upper side of the telescope, and the player holding the controllers with both hands is instructed to move both arms to hold the telescope up. Then, as shown in FIG. 10(2), an image representing a state of looking through the telescope is displayed, and a motion instruction "Find airplane!" is displayed. This motion instruction is an instruction to ask the player to move the telescope (the left and right hands holding the controllers) to find an airplane.

Then, the orientation of the telescope is changed in the virtual space on the basis of the movement of the left and right controllers corresponding to the movement of the left and right hands of the player. In FIG. 10(3), the orientation of the telescope changes in the virtual space and the tail of the airplane is visible. Then, the short game is cleared if, within a predetermined time (e.g., 10 seconds) after the start of the short game, the player successfully makes the entire airplane visible through the telescope as shown in FIG. 10(4) by moving the left and right hands. On the other hand, if the player fails to make the entire airplane visible through the telescope within the predetermined time (e.g., 10 seconds) after the start of the short game, the short game fails to be cleared.

In the above, the case where the right hand of the player is set as a dominant hand in advance before the start of the short game has been described. In the case where the right hand is a dominant hand, it is generally easier to operate the telescope if the right hand which is a dominant hand is on the upper side when holding the telescope. Therefore, in the pose (first pose) of the model object 310 in FIG. 9(4), the right hand is on the upper side of the left hand. In addition, the right hand of the human object holding the telescope in FIG. 10(1) is also on the upper side of the left hand.

On the other hand, in the case where the left hand of the player is set as a dominant hand in advance before the start of the short game, the model video 1 in FIG. 9 is laterally inverted. Specifically, in FIG. 9, the model object 310 moves such that the left hand is on the upper side of the right hand while rotating clockwise, and finally makes a pose (second pose) viewed from the left oblique back side. In addition, the human object holding the telescope in FIG. 10(1) is also laterally inverted in the video. Also, in the case where the left hand of the player is set as a dominant hand in advance, operation data (left operation data) outputted from the left controller 3 and operation data (right operation data) outputted from the right controller 4 are swapped and used for motion determination (evaluation of controller movement). By doing so, regardless of whether the right hand is set as a dominant hand or the left hand is set as a dominant hand, movement of the telescope can be controlled such that the right operation data is associated with the upper side of the telescope (a portion of the telescope closer to the eye when the telescope is held up) and the left operation data is associated with the lower side of the telescope (a portion of the telescope farther from the eye when the telescope is held up).

Figure 11:
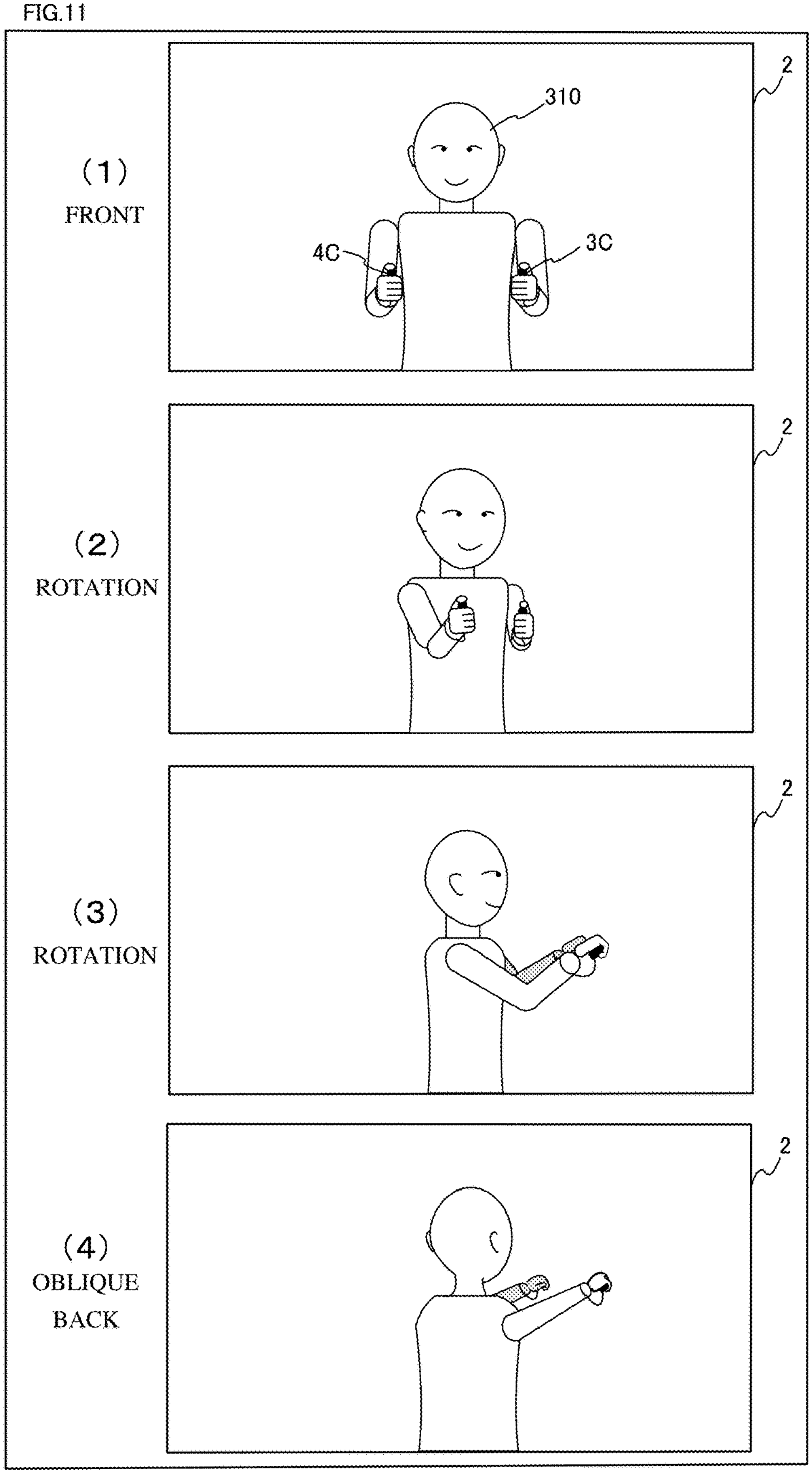
FIG. 11 illustrates a non-limiting example of a model video in which a model object holding controllers makes a pose.

FIG. 11 illustrates an example of a model video (animation; sometimes referred to as "model video 2") showing the player how to hold the controllers before the start of a short game in which the wrinkles of a washed shirt are smoothed out. FIG. 11 illustrates an example of the short game in which the wrinkles of a washed shirt are smoothed out.

The model video 2 is started from a state shown in FIG. 11(1) which is the same as in FIG. 9(1). Then, as shown in FIG. 11(2), the model object 310 extends the left and right arms by projecting the left and right hands forward from the trunk while rotating counterclockwise. Then, as shown in FIG. 11(3), the model object 310 further extends the left and right arms by projecting the left and right hands with the backs of the hands on the upper side while further rotating counterclockwise. Then, as shown in FIG. 11(4), the model object 310 further rotates counterclockwise to a position where the right oblique back side (right oblique back portion) of the model object 310 is captured by the virtual camera, makes a pose (laterally symmetric pose) in which the left and right hands are extended forward with the backs of the hands on the upper side, and stops for a predetermined time (e.g. 0.5 seconds), and then the animation of the model video 2 is completed.

As described above, in the model video 2, the model object 310 moves both hands holding the controllers while rotating, and finally makes a pose viewed from the right oblique back side (a pose in which the oblique back portion is displayed), in which the state of the arms and the hands is visible. This allows the player to intuitively understand that the model object 310 is not displayed so as to be laterally inverted as if reflected in a mirror, and also allows the player to quickly and intuitively understand a pose to be made at the start of a short game described later with reference to FIG. 12 (a pose to be made while holding the controllers with both hands).

Figure 12:
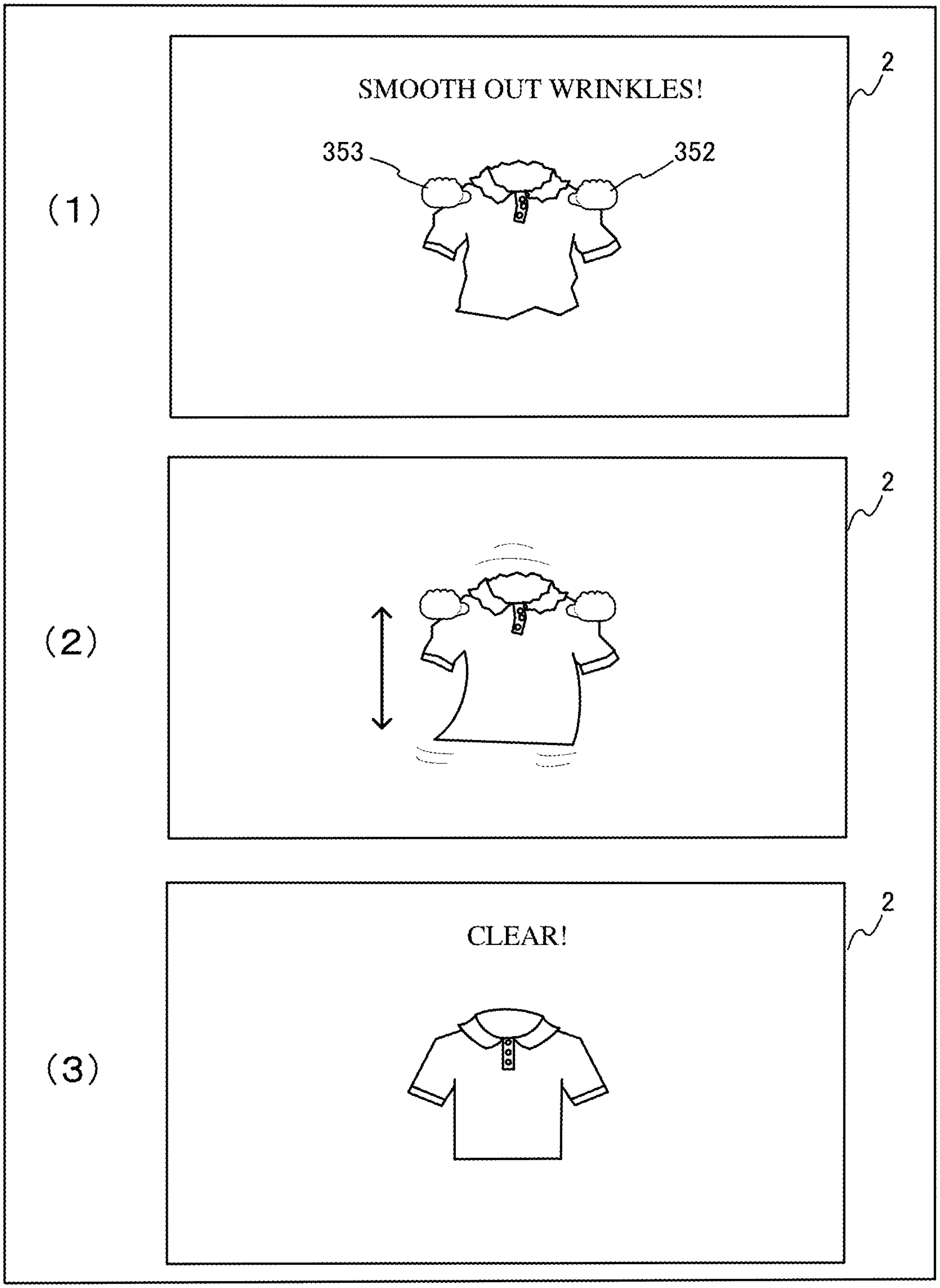
FIG. 12 illustrates a non-limiting example of a short game.

When the display of the model video 2 is completed, the short game in FIG. 12 in which the wrinkles of a washed shirt are smoothed out starts. First, as shown in FIG. 12(1), an image in which a washed shirt having many wrinkles is grabbed by a left hand object 353 and a right hand object 352 is displayed. The positional relationship between the left hand object 353 and the right hand object 352 grabbing this shirt are the same as or similar to the positional relationship between both hands in the pose shown in the model video 2 (see FIG. 11(4)). In addition, as shown in FIG. 12(1), a motion instruction "Smooth out the wrinkles!" is displayed on the upper side of the shirt, and the player holding the controllers with both hands is instructed to move both hands to swing the shirt up and down to smooth out the wrinkles. Then, as shown in FIG. 12(2), the wrinkles are gradually smoothed out by moving the left hand object 353 and the right hand object 352 to swing the shirt in the virtual space on the basis of the movement of the left and right controllers corresponding to up and down swinging of the left and right hands of the player. Then, the short game is cleared if, within a predetermined time (e.g., about 4 seconds, or even shorter depending on the game progress) after the start of the short game, a state where all the wrinkles of the shirt are smoothed out is successfully reached as shown in FIG. 12(3). On the other hand, if a state where all the wrinkles of the shirt are smoothed out fails to be reached within the predetermined time (e.g., about 4 seconds, or even shorter depending on the game progress) after the start of the short game, the short game fails to be cleared.

Figure 13:
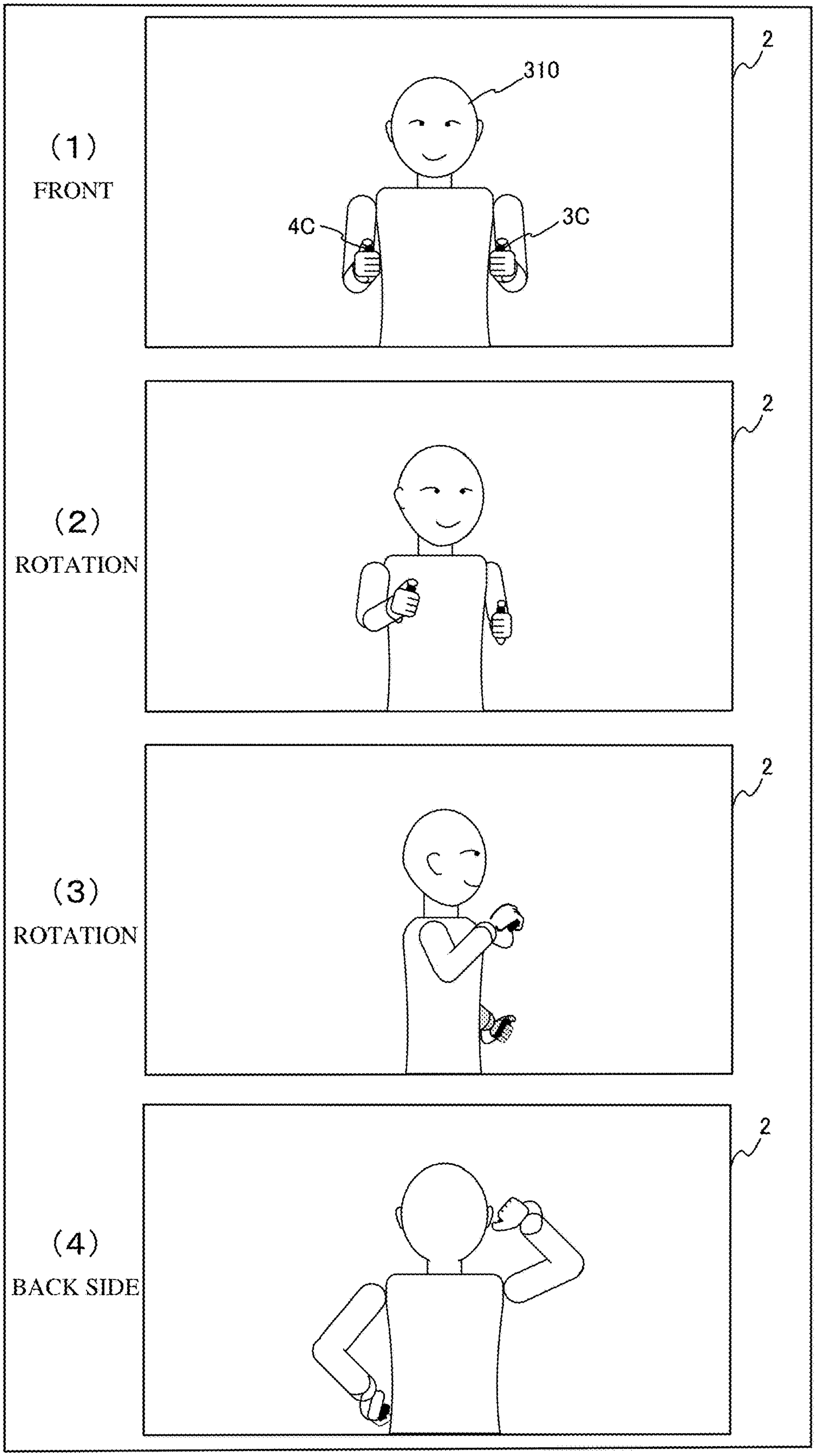
FIG. 13 illustrates a non-limiting example of a model video in which a model object holding controllers makes a pose.
Figure 14:
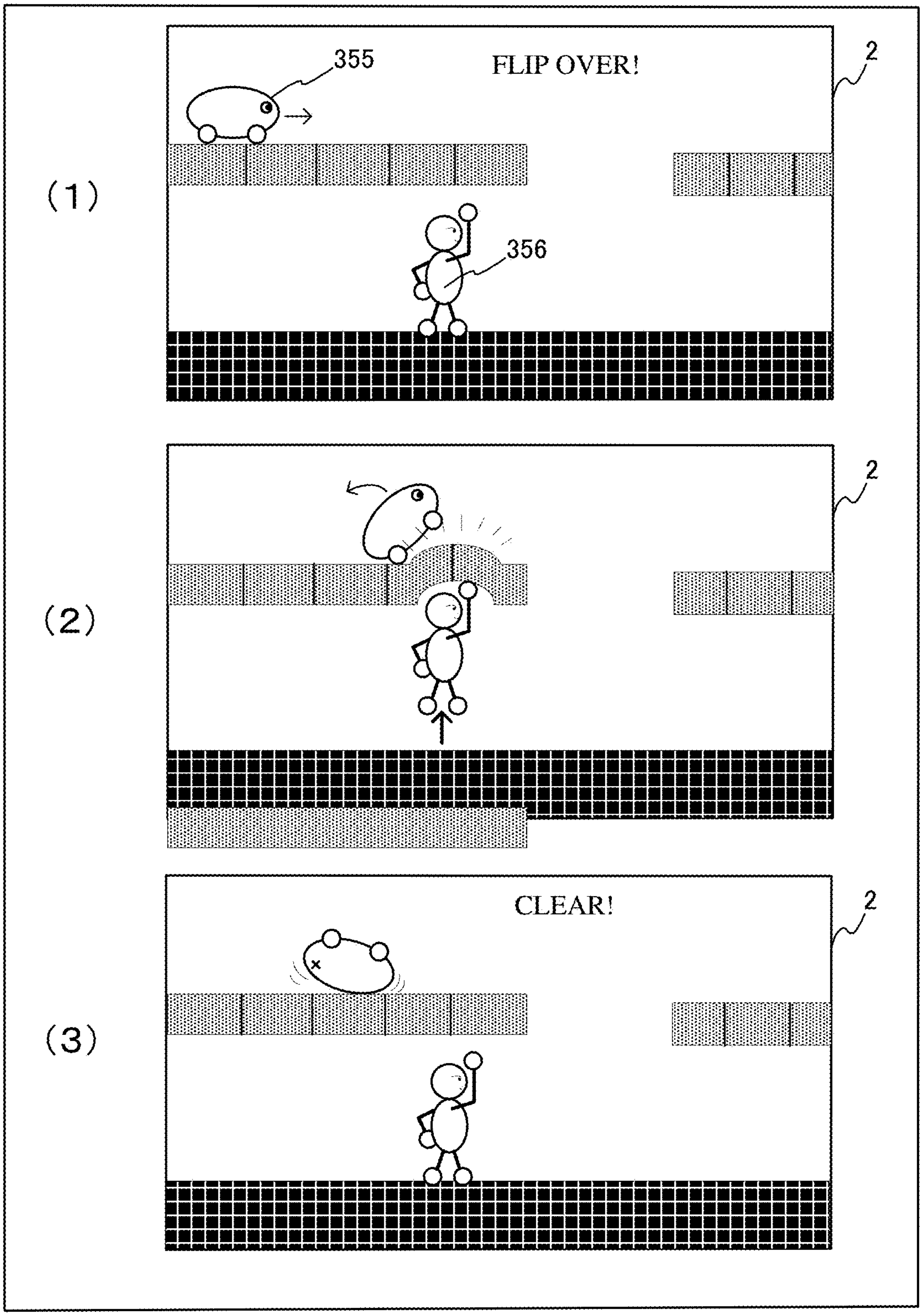
FIG. 14 illustrates a non-limiting example of a short game.

FIG. 13 illustrates an example of a model video (animation: sometimes referred to as "model video 3") showing the player how to hold the controllers before the start of a short game in which an enemy object is flipped over. FIG. 14 illustrates an example of the short game in which an enemy object is flipped over.

The model video 3 is started from a state shown in FIG. 13(1) which is the same as in FIG. 9(1). Then, as shown in FIG. 13(2), the model object 310 raises the right hand with the left hand lowered while rotating counterclockwise. Then, as shown in FIG. 13(3), the model object 310 further raises the right hand with the left hand lowered while further rotating counterclockwise. Then, as shown in FIG. 13(4), the model object 310 further rotates counterclockwise to a position where the back portion of the model object 310 is captured from directly behind by the virtual camera, makes a pose (laterally asymmetric pose) in which the right hand is positioned next to the right ear and the left hand is positioned next to the waist, and stops for a predetermined time (e.g. 0.5 seconds), and then the animation of the model video 3 is completed.

As described above, in the model video 3, the model object 310 moves both hands holding the controllers while rotating, and finally makes a pose viewed from directly behind (a pose in which the back portion is displayed), in which the state of the arms and the hands is visible. This allows the player to intuitively understand that the model object 310 is not displayed so as to be laterally inverted as if reflected in a mirror, and also allows the player to quickly and intuitively understand a pose to be made at the start of a short game described later with reference to FIG. 14 (a pose to be made while holding the controllers with both hands).

When the display of the model video 3 is completed, the short game in FIG. 14 in which an enemy object is flipped over starts. First, as shown in FIG. 14(1), an image in which an enemy object 355 is moving on a plurality of blocks placed on the upper side of a player object 356, which is operated by the player, is displayed. The pose of the player object 356 is the same as or similar to the pose shown in the model video 3 (see FIG. 13(4)). In addition, as shown in FIG. 14(1), a motion instruction "Flip over!" is displayed on the upper side of the player object 356, and the player holding the controllers with both hands is instructed to jump while raising the right hand to flip over the enemy object 355.

Then, if, at the timing when the enemy object 355 comes directly above the player object 356, the player object 356 jumps while raising the right hand to push up the blocks above the player object 356 on the basis of the movement of the left and right controllers corresponding to the motion of the player jumping while raising the right hand (FIG. 14(2)), the enemy object 355 is flipped over and the short game is cleared (FIG. 14(3)). On the other hand, if, at a timing different from the timing when the enemy object 355 comes directly above the player object 356, the player jumps while raising the right hand, the enemy object 355 is not flipped over and the short game fails to be cleared.

In the above, the case where the right hand of the player is set as a dominant hand in advance before the start of the short game has been described. In the case where the right hand is a dominant hand, generally, a motion of jumping while raising the right hand can be made properly.

On the other hand, in the case where the left hand of the player is set as a dominant hand in advance before the start of the short game, the model video 3 in FIG. 13 is laterally inverted. Specifically, in FIG. 13, the model object 310 moves to a position where the left hand comes next to the left ear and the right hand comes to the waist, while rotating clockwise, and finally makes a pose viewed from directly behind. The player object 356 in FIG. 14 may be laterally inverted, or the video may be left as is without laterally inverting the player object 356. Also, in the case where the left hand of the player is set as a dominant hand in advance, operation data outputted from the left controller 3 and operation data outputted from the right controller 4 are swapped and used for motion determination (evaluation of controller movement). By doing so, in the case where the left hand of the player is set as a dominant hand, if the player makes a motion of jumping while raising the right hand, the player object 356 jumps while raising the right hand to push up the blocks above the player object 356 (see FIG. 14(2)). Owing to this, a left-handed player who is less likely to properly make a motion of jumping while raising the right hand can also enjoy the short game in FIG. 14 in the same manner as a right-handed player. In the short game in FIG. 14, it is sufficient that the player object 356 can make a motion of pushing up in a state where the player is in the pose to be made. Thus, the hand to be raised does not have to be the same as in the pose in the model video 3 to be made by the player, and, for example, in the case where it is necessary to use a predetermined graphic, a predetermined hand may be raised regardless of the model video 3.

Figure 15:
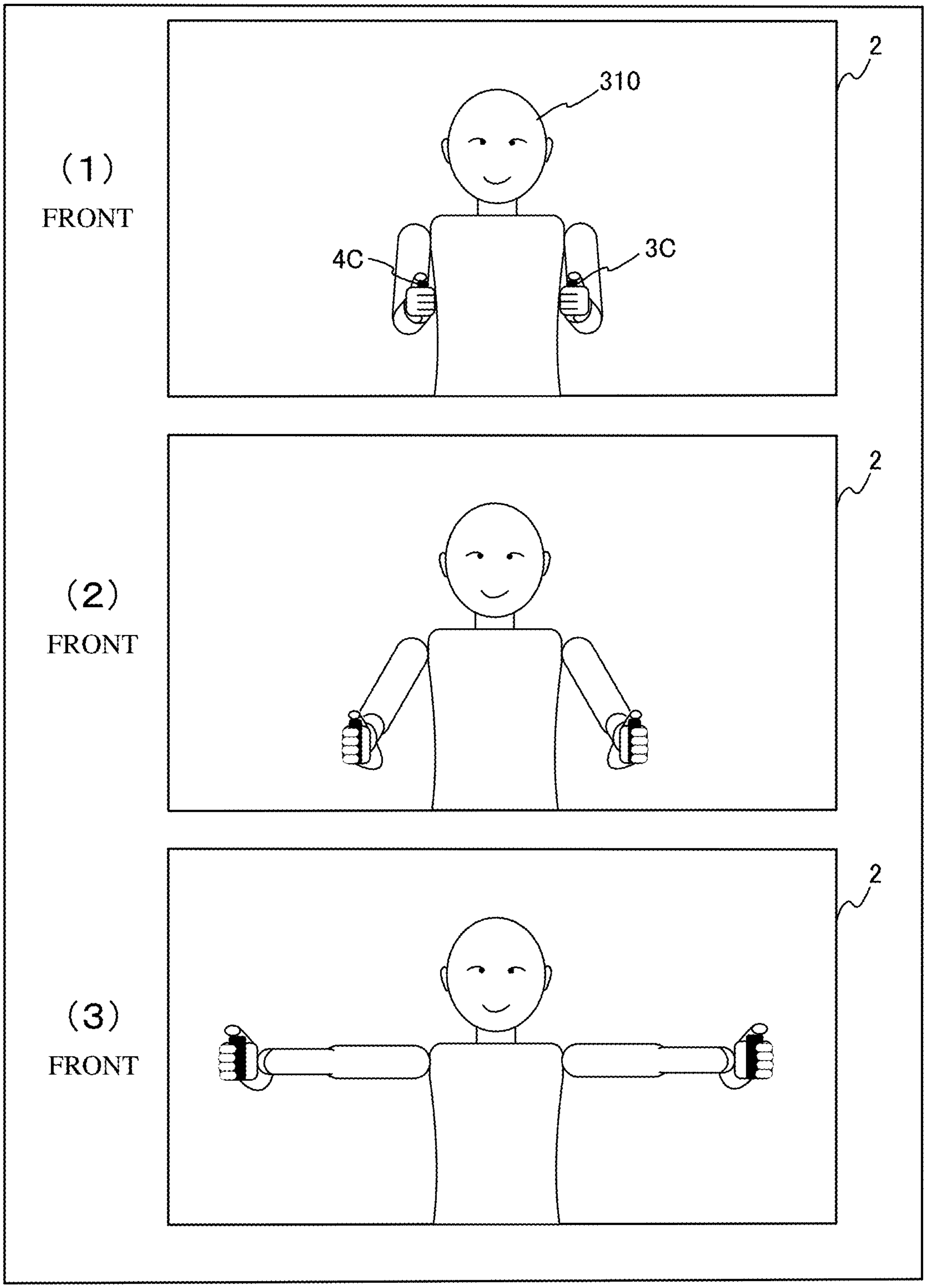
FIG. 15 illustrates a non-limiting example of a model video in which a model object holding controllers makes a pose.
Figure 16:
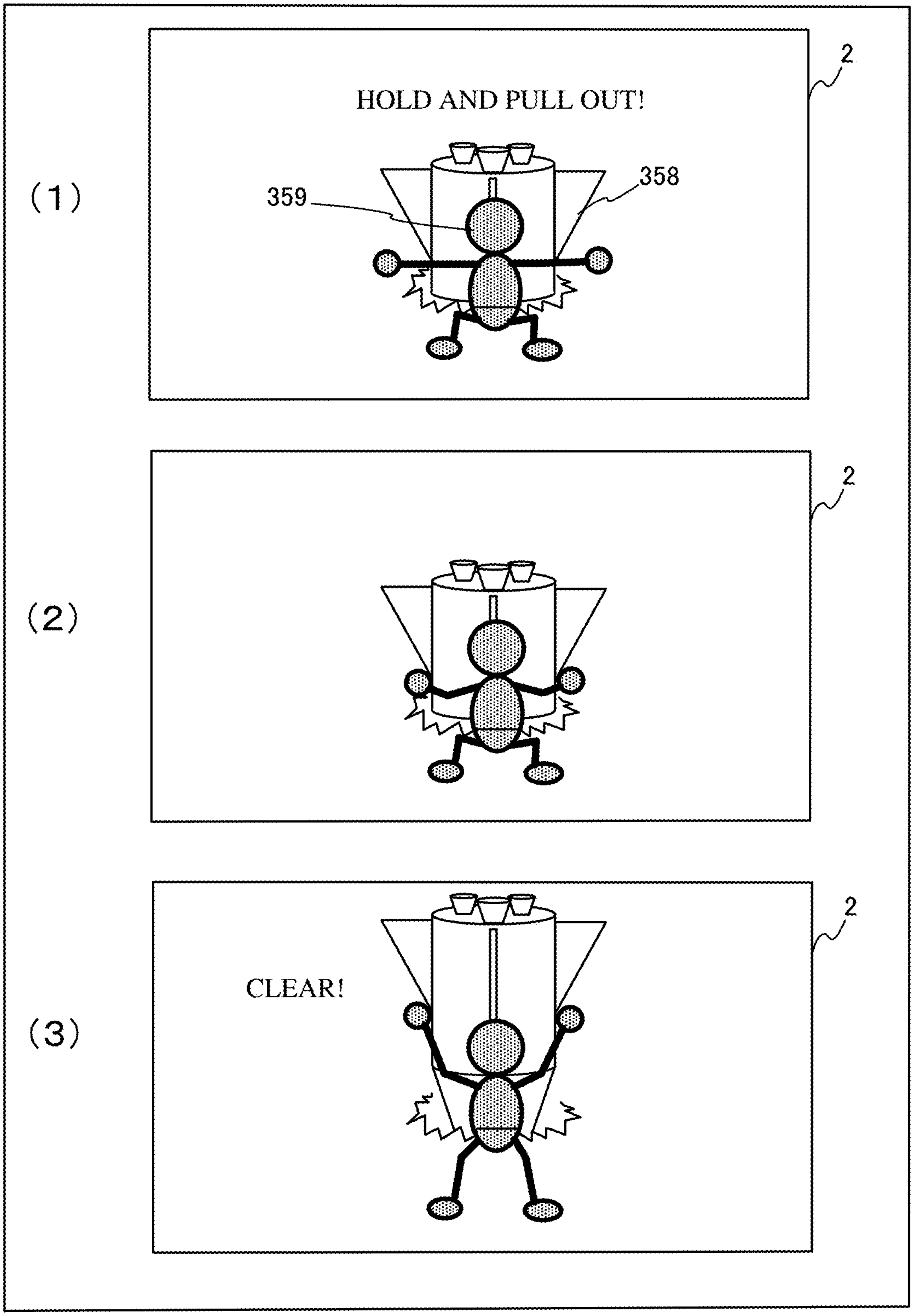
FIG. 16 illustrates a non-limiting example of a short game.

FIG. 15 illustrates an example of a model video (animation: sometimes referred to as "model video 4") showing the player how to hold the controllers before the start of a short game in which a rocket is held and pulled out. FIG. 16 illustrates an example of the short game in which a rocket is held and pulled out.

The model video 4 is started from a state shown in FIG. 15(1) which is the same as in FIG. 9(1). Then, as shown in FIG. 15(2), the model object 310 widens the interval between the left and right hands while facing the front. Then, as shown in FIG. 15(3), while facing the front, the model object 310 makes a pose (laterally symmetric pose) in which both arms extend straight such that the palms face the front, and stops for a predetermined time (e.g., 0.5 seconds), and then the animation of the model video 4 is completed.

As described above, in the model video 4, the model object 310 moves both hands holding the controllers while facing the front (in the direction toward the virtual camera), and finally makes a pose viewed from the front side, in which the state of the arms and the hands is visible. This allows the player to quickly and intuitively understand a pose to be made at the start of the short game described later with reference to FIG. 16 (a pose to be made while holding the controllers with both hands). Here, the pose in FIG. 15(3) is a laterally symmetric pose, and the later-described short game in which a rocket is held and pulled out is a game in which operations are performed in a laterally symmetric manner. Thus, whether or not the model object 310 is displayed so as to be laterally inverted as if reflected in a mirror does not become a problem. Therefore, in the model video 4, there is no need to rotate the model object 310 to indicate that the model object 310 is not displayed so as to be laterally inverted, and thus the model object 310 makes a motion of making a pose while facing the front.

In FIG. 15, the model object 310 makes a pose while facing the front. However, the model object 310 may make a pose while facing the back. By doing so, similarly, the player can intuitively understand the pose of holding the controllers.

When the display of the model video 4 is completed, the short game in FIG. 16 in which a rocket is held and pulled out starts. First, as shown in FIG. 16(1), an image in which a player object 359, which is operated by the player, extends both arms to the left and right and faces a rocket 358 stuck in the ground, is displayed. In addition, as shown in FIG. 16(1), a motion instruction "Hold and pull out!" is displayed on the upper side of the rocket 358, and the player holding the controllers with both hands is instructed to hold the rocket 358 with the left and right hands (arms) and lift the rocket 358 upward to pull out the rocket 358. Then, as shown in FIG. 16(2), the player object 359 holds the rocket 358 with the left and right hands (arms) in the virtual space on the basis of the movement of the left and right controllers corresponding to the motion of the player as if holding with the left and right hands (arms). Then, as shown in FIG. 16(3), the short game is cleared if the player object 359 pulls out the rocket 358 with the left and right hands (arms) in the virtual space on the basis of the movement of the left and right controllers corresponding to the motion of the player moving the left and right hands (arms) upward. On the other hand, if the rocket 358 fails to be pulled out within a predetermined time (e.g., 12 seconds) after the start of the short game, the short game fails to be cleared.

[Details of Information Processing of Exemplary Embodiment]

Figure 17:
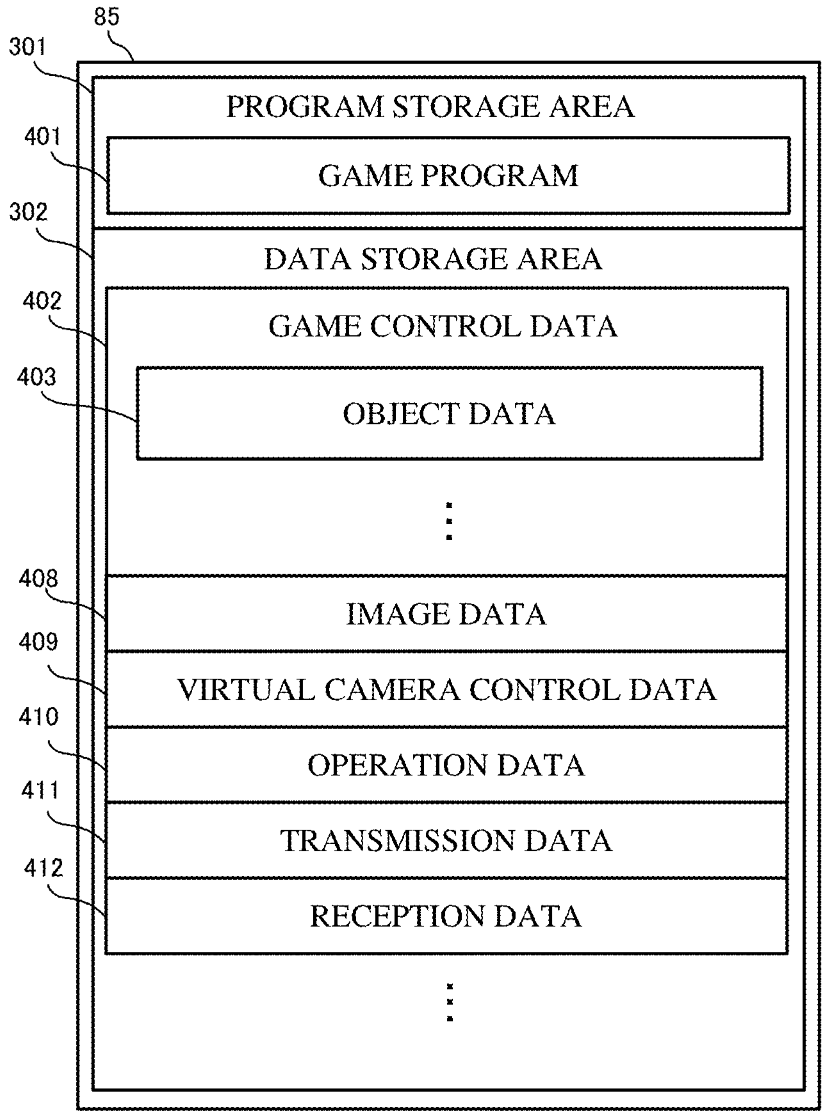
FIG. 17 shows a non-limiting example of various types of data stored in a DRAM 85.

Next, the information processing of the exemplary embodiment will be described in detail with reference to FIG. 17 and FIG. 18.

[Data to be Used]

Various types of data used in the game processing will be described. FIG. 17 shows an example of data stored in the DRAM 85 of the game system 1. As shown in FIG. 17, the DRAM 85 is provided with at least a program storage area 301 and a data storage area 302. A game program 401 is stored in the program storage area 301. In the data storage area 302, game control data 402, image data 408, virtual camera control data 409, operation data 410, transmission data 411, reception data 412, etc., are stored. The game control data 402 includes object data 403.

The game program 401 is a game program for executing the game processing.

The object data 403 is data of objects to be placed in the virtual space, such as player objects, enemy objects, items, ground, blocks, etc. The object data 403 also includes data of the coordinates (position), orientation, posture, state, etc., of each object.

The image data 408 is image data of backgrounds, virtual effects, etc.

The virtual camera control data 409 is data for controlling the motion of the virtual camera placed in the virtual space. Specifically, the virtual camera control data 409 is data that specifies the position/orientation, angle of view, imaging direction, etc., of the virtual camera.

The operation data 410 is data indicating the contents of operations performed on the left controller 3 and the right controller 4. The operation data 410 includes, for example, data indicating motions and orientation changes of the left controller 3 and the right controller 4 and input states regarding press states and the like of various buttons. The contents of the operation data 410 are updated at a predetermined cycle on the basis of signals from the left controller 3 and the right controller 4.

The transmission data 411 is data to be transmitted to other game systems 1, and is data including at least information for identifying the transmission source, and the contents of the operation data 410. The transmission data 411 includes data, regarding an own player character, to be transmitted to another game system 1 of a multiplay partner (data indicating coordinates (position), posture, state, etc.).

The reception data 412 is data stored such that transmission data received from other game systems 1 (i.e., transmission sources) can be discerned for each of the other game systems 1. The reception data 412 includes data, regarding another player character, received from another game system 1 of a multiplay partner (or a server) (data indicating coordinates (position), posture, state, etc.).

In addition, various types of data to be used in game processing are stored as necessary in the DRAM 85.

[Details of Game Processing]

Next, the game processing according to the exemplary embodiment will be described in detail with reference to a flowchart. FIG. 18 is an example of a flowchart showing the details of the game processing according to the exemplary embodiment.

Figure 18:
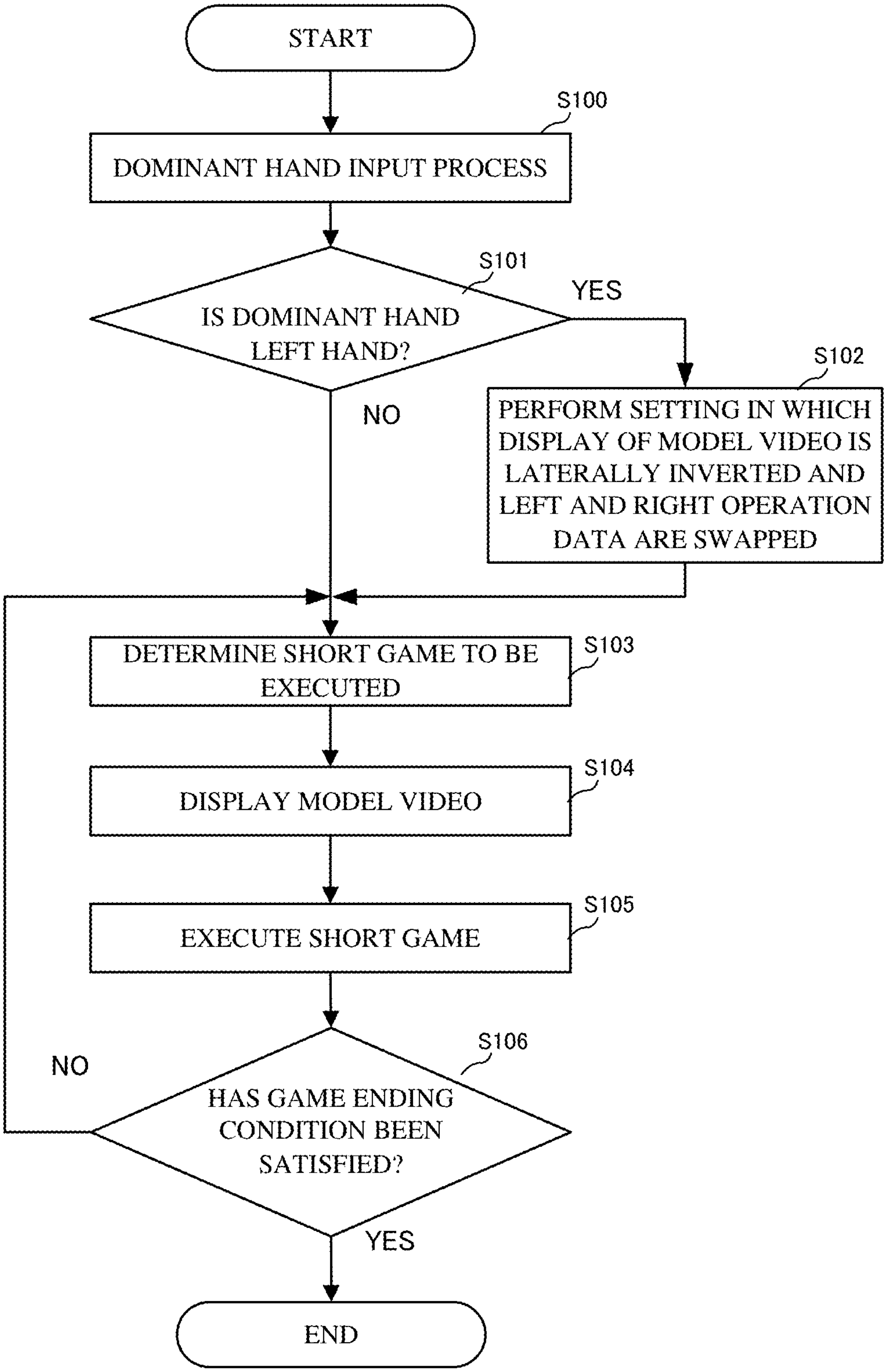
FIG. 18 is a non-limiting example of a flowchart of game processing.

First, as shown in FIG. 18, when the game processing starts, the processor 81 executes a dominant hand input process using the game program 401, etc., in step S100. Specifically, the processor 81 displays an image (not shown) for inputting a dominant hand, and the player is allowed to input whether their dominant hand is a right hand or a left hand. Then, the processing proceeds to step S101.

In step S101, the processor 81 determines whether or not the dominant hand has been inputted as a left hand in step S100. When the determination in step S101 is YES, the processing proceeds to step S102. When this determination is NO, the processing proceeds to step S103.

In step S102, the processor 81 performs setting in which display of a model video is laterally inverted and operation data acquired from the left and right controllers are swapped. Specifically, as described for the short game with reference to FIG. 9 and FIG. 10 and as described for the short game with reference to FIG. 13 and FIG. 14, the processor 81 performs setting in which operation data outputted from the left controller 3 and operation data outputted from the right controller 4 are swapped, motion determination (evaluation of controller movement) is performed in a process in step S105 described later, and the short game is caused to progress. Then, the processing proceeds to step S103.

The process of setting a dominant hand in steps S100 to S102 may not necessarily be executed each time the game is started as described above, but may be executed by the player performing a predetermined setting operation at any timing.

In step S103, the processor 81 determines a short game to be executed. The order of the short games to be executed is determined at the start of the game processing. The order of the short games to be executed may be determined in advance. Then, the processing proceeds to step S104.

In step S104, the processor 81 displays a model video corresponding to the short game determined to be executed in step S103. For example, when the short game described with reference to FIG. 12 has been determined to be executed, the processor 81 displays the model video 2 described with reference to FIG. 11. Also, for example, when the short game described with reference to FIG. 14 has been determined to be executed, the processor 81 displays the model video 3 described with reference to FIG. 13. Then, the processing proceeds to step S105.

In step S105, the processor 81 executes the short game determined to be executed in step S103. Then, the processing proceeds to step S106.

In step S106, the processor 81 determines whether or not a game ending condition has been satisfied. The game ending condition is a condition that the short game was failed to be cleared. The game ending condition is not limited thereto, and may be, for example, a condition that the short game was failed to be cleared a predetermined number of times (e.g., five times). When the determination in step S106 is YES, the game ends, and the processing ends. When this determination is NO, the processing returns to step S103, and a short game to be executed next is determined.

As described above, according to the exemplary embodiment, before the start of the short game, the animated model video in which the model object imitating the player holding the controllers makes a pose is displayed (see FIG. 9 to FIG. 16). This allows the player to intuitively understand how to pose with (hold) the controllers at the start of the short game. In addition, according to the exemplary embodiment, the animated model video in which the model object makes a pose such that the state of both hands is recognized is displayed (see FIG. 9, FIG. 11, FIG. 13, and FIG. 15). Furthermore, in the case of a pose in which the hands are positioned in front of the body of the model object, the model object is displayed so as to be viewed from the obliquely back side, whereby the state of both hands can be recognized (see FIG. 9 and FIG. 11). This allows the player to accurately understand how to pose with (hold) the controllers at the start of the short game. Moreover, according to the exemplary embodiment, the animated model video in which the model object rotates and makes a laterally asymmetric pose is displayed (see FIG. 9 and FIG. 13). This allows the player to intuitively understand that the model video is not displayed so as to be laterally inverted as if reflected in a mirror, even if the pose is laterally asymmetric.

[Modifications]

In the above exemplary embodiment, the model object 310 appears to rotate in the model video by rotating the model object 310 in the virtual space (see FIG. 9, etc.). However, the present disclosure is not limited thereto, and the model object 310 may appear to rotate in the model video by moving the virtual camera in the virtual space so as to rotate around the model object 310.

In the above exemplary embodiment, the model video is a three-dimensional video obtained by capturing the virtual space by the virtual camera (see FIG. 9, etc.). However, the present disclosure is not limited thereto, and the model video may be a two-dimensional image.

In the above exemplary embodiment, the movement of the hands of the player is detected by the inertial sensors of the controllers. However, the present disclosure is not limited thereto, and for example, an image of the player may be taken from the front side, and the movement of the hands of the player may be detected on the basis of the taken image of the player.

In the above exemplary embodiment, the evaluation to determine success or failure in the short game is performed on the basis of the operation data acquired from the controllers. However, the present disclosure is not limited thereto, and an evaluation to assign a score in the short game may be performed on the basis of the operation data acquired from the controllers.

In the exemplary embodiment, a case in which a series of processes regarding the game processing are executed in a single game apparatus has been described. In another exemplary embodiment, the series of processes may be executed in an information processing system including a plurality of information processing apparatuses. For example, in an information processing system including a terminal-side apparatus and a server-side apparatus communicable with the terminal-side apparatus via a network, some of the series of processes above may be executed by the server-side apparatus. Further, in an information processing system including a terminal-side apparatus and a server-side apparatus communicable with the terminal-side apparatus via a network, major processes among the series of processes above may be executed by the server-side apparatus, and some of the processes may be executed in the terminal-side apparatus. Further, in the above information processing system, the system on the server side may be implemented by a plurality of information processing apparatuses, and processes that should be executed on the server side may be shared and executed by a plurality of information processing apparatuses. Further, a configuration of a so-called cloud gaming may be adopted. For example, a configuration may be adopted in which: the game apparatus sends operation data indicating operations performed by the user to a predetermined server; various game processes are executed in the server; and the execution result is streaming-distributed as a moving image/sound to the game apparatus.

While the exemplary embodiment and the modifications have been described, the description thereof is in all aspects illustrative and not restrictive. It is to be understood that various other modifications and variations may be made to the exemplary embodiment and the modifications.

What is claimed is:

1. A non-transitory computer-readable storage medium having stored therein instructions that, when executed by a processor of an information processing apparatus configured to execute a plurality of types of games in succession, cause the information processing apparatus to perform operations comprising:

for each of the games executed in succession, during a waiting period before start of the respective game, displaying a model video in which a model object imitating a player holding a controller makes a pose set in advance according to the type of the respective game, and, for a first type of game, displaying the model video as an animation in which the model object rotates from an orientation in which a front side of the model object is displayed to an orientation in which at least a part of a back side of the model object is displayed; and starting the respective game after the waiting period, displaying at least a motion instruction indicating a motion to be performed by the player in the respective game, performing an evaluation of movement of the controller based on operation data acquired from the controller including an inertial sensor, and causing the respective game to progress based on the evaluation.

2. The storage medium according to claim 1, wherein the operations further comprise:

during the waiting period, displaying the model video by the model object imitating a player holding controllers with left and right hands thereof; and in the game, performing the evaluation based on first operation data acquired from a first controller and second operation data acquired from a second controller.

3. The storage medium according to claim 2, wherein the first type of game includes a second type of game in which the pose is set as a laterally asymmetric pose for the model object.

4. The storage medium according to claim 3, wherein the operations further comprise:

in a predetermined scene before the plurality of types of games are executed in succession, setting one of the left and right hands of the player as a dominant hand; and for the second type of game, according to the set dominant hand, in the display of the model video, causing the model object to make a first pose or a second pose laterally inverted from the first pose, and in the game, swapping the first operation data and the second operation data used for the evaluation, and performing the evaluation.

5. The storage medium according to claim 2, wherein the operations further comprise:

for a third type of game included in the first type of game, displaying the model video as an animation in which the model object rotates from the orientation in which the front side of the model object is displayed to an orientation in which an oblique back portion of the model object is displayed; and for a fourth type of game included in the first type of game, displaying the model video as an animation in which the model object rotates from the orientation in which the front side of the model object is displayed to an orientation in which a back portion of the model object is displayed.

6. The storage medium according to claim 5, wherein the third type of game is a game in which the pose is set as a pose in which the left and right hands are positioned in front of the model object.

7. The storage medium according to claim 2, wherein the operations further comprise, for a fifth type of game in which the pose is set as a laterally symmetric pose for the model object and which is not included in the first type of game, displaying the model video as an animation remaining in an orientation in which the front side or the back side of the model object is displayed.

8. The storage medium according to claim 1, wherein the operations further comprise:

displaying the model video by rendering the model object in the virtual space based on a virtual camera; and for the first type of game, displaying the model video while rotating the model object or the virtual camera from a positional relationship in which the front side of the model object faces the virtual camera to a positional relationship in which the back side or an oblique back side of the model object faces the virtual camera.

9. The storage medium according to claim 8, wherein the operations further comprise, for the first type of game, displaying the model video as an animation in which the model object makes the pose, while rotating the model object or the virtual camera.

10. A game processing system configured to execute a plurality of games in succession, the game processing system comprising a processor and a memory coupled thereto, the processor being configured to control the game processing system to perform operations comprise:

for each of the games executed in succession, during a waiting period before start of the respective game, displaying a model video in which a model object imitating a player holding a controller makes a pose set in advance according to the type of the respective game, and, for a first type of game, displaying the model video as an animation in which the model object rotates from an orientation in which a front side of the model object is displayed to an orientation in which at least a part of a back side of the model object is displayed; and starting the respective game after the waiting period, displaying at least a motion instruction indicating a motion to be performed by the player in the respective game, performing an evaluation of movement of the controller based on operation data acquired from the controller including an inertial sensor, and causing the respective game to progress based on the evaluation.

11. The game processing system according to claim 10, wherein the operations further comprise:

during the waiting period, displaying the model video by the model object imitating a player holding controllers with left and right hands thereof; and in the game, performing the evaluation based on first operation data acquired from a first controller and second operation data acquired from a second controller.

12. The game processing system according to claim 11, wherein the first type of game includes a second type of game in which the pose is set as a laterally asymmetric pose for the model object.

13. The game processing system according to claim 12, wherein the operations further comprise:

in a predetermined scene before the plurality of types of games are executed in succession, setting one of the left and right hands of the player as a dominant hand; and for the second type of game, according to the set dominant hand, in the display of the model video, causing the model object to make a first pose or a second pose laterally inverted from the first pose, and in the game, swapping the first operation data and the second operation data used for the evaluation, and performing the evaluation.

14. The game processing system according to claim 11, wherein the operations further comprise:

for a third type of game included in the first type of game, displaying the model video as an animation in which the model object rotates from the orientation in which the front side of the model object is displayed to an orientation in which an oblique back portion of the model object is displayed; and for a fourth type of game included in the first type of game, displaying the model video as an animation in which the model object rotates from the orientation in which the front side of the model object is displayed to an orientation in which a back portion of the model object is displayed.

15. The game processing system according to claim 14, wherein the third type of game is a game in which the pose is set as a pose in which the left and right hands are positioned in front of the model object.

16. The game processing system according to claim 11, wherein the operations further comprise, for a fifth type of game in which the pose is set as a laterally symmetric pose for the model object and which is not included in the first type of game, displaying the model video as an animation remaining in an orientation in which the front side or the back side of the model object is displayed.

17. The game processing system according to claim 10, wherein the operations further comprise:

displaying the model video by rendering the model object in the virtual space based on a virtual camera; and for the first type of game, displaying the model video while rotating the model object or the virtual camera from a positional relationship in which the front side of the model object faces the virtual camera to a positional relationship in which the back side or an oblique back side of the model object faces the virtual camera.

18. The game processing system according to claim 17, wherein the operations further comprise, for the first type of game, displaying the model video as an animation in which the model object makes the pose, while rotating the model object or the virtual camera.

19. A game processing apparatus configured to execute a plurality of games in succession, the game processing apparatus comprising a processor and a memory coupled thereto, the memory storing instructions that, when executed by the processor, cause the processor to perform operations comprising:

for each of the games executed in succession, during a waiting period before start of the respective game, displaying a model video in which a model object imitating a player holding a controller makes a pose set in advance according to the type of the respective game, and, for a first type of game, displaying the model video as an animation in which the model object rotates from an orientation in which a front side of the model object is displayed to an orientation in which at least a part of a back side of the model object is displayed; and starting the respective game after the waiting period, displaying at least a motion instruction indicating a motion to be performed by the player in the respective game, performing an evaluation of movement of the controller based on operation data acquired from the controller including an inertial sensor, and causing the respective game to progress based on the evaluation.

20. A game processing method executable by a processor of a game processing system for executing a plurality of games in succession, the game processing method comprising:

for each of the games executed in succession, during a waiting period before start of the respective game, displaying a model video in which a model object imitating a player holding a controller makes a pose set in advance according to the type of the respective game, and, for a first type of game, displaying the model video as an animation in which the model object rotates from an orientation in which a front side of the model object is displayed to an orientation in which at least a part of a back side of the model object is displayed; and starting the respective game after the waiting period, displaying at least a motion instruction indicating a motion to be performed by the player in the respective game, performing an evaluation of movement of the controller based on operation data acquired from the controller including an inertial sensor, and causing the respective game to progress based on the evaluation.

21. The game processing method according to claim 20, further comprising:

during the waiting period, displaying the model video by the model object imitating a player holding controllers with left and right hands thereof; and in the game, performing the evaluation based on first operation data acquired from a first controller and second operation data acquired from a second controller.

22. The game processing method according to claim 21, wherein the first type of game includes a second type of game in which the pose is set as a laterally asymmetric pose for the model object.

23. The game processing method according to claim 22, further comprising:

in a predetermined scene before the plurality of types of games are executed in succession, setting one of the left and right hands of the player as a dominant hand; and for the second type of game, according to the set dominant hand, in the display of the model video, causing the model object to make a first pose or a second pose laterally inverted from the first pose, and in the game, swapping the first operation data and the second operation data used for the evaluation, and perform the evaluation.

24. The game processing method according to claim 21, further comprising:

for a third type of game included in the first type of game, displaying the model video as an animation in which the model object rotates from the orientation in which the front side of the model object is displayed to an orientation in which an oblique back portion of the model object is displayed; and for a fourth type of game included in the first type of game, displaying the model video as an animation in which the model object rotates from the orientation in which the front side of the model object is displayed to an orientation in which a back portion of the model object is displayed.

25. The game processing method according to claim 24, wherein the third type of game is a game in which the pose is set as a pose in which the left and right hands are positioned in front of the model object.

26. The game processing method according to claim 21, further comprising, for a fifth type of game in which the pose is set as a laterally symmetric pose for the model object and which is not included in the first type of game, displaying the model video as an animation remaining in an orientation in which the front side or the back side of the model object is displayed.

27. The game processing method according to claim 20, further comprising:

displaying the model video by rendering the model object in the virtual space based on a virtual camera; and for the first type of game, displaying the model video while rotating the model object or the virtual camera from a positional relationship in which the front side of the model object faces the virtual camera to a positional relationship in which the back side or an oblique back side of the model object faces the virtual camera.

28. The game processing method according to claim 27, further comprising, for the first type of game, displaying the model video as an animation in which the model object makes the pose, while rotating the model object or the virtual camera.

* * * * *